United States Patent [19]
Ogawa

[11] Patent Number: 5,751,352
[45] Date of Patent: May 12, 1998

[54] EXPOSURE CONTROL DEVICE

[75] Inventor: Kimiaki Ogawa, Itabashi-ku, Japan

[73] Assignee: Asahi Kogaku Kogyo Kabushiki Kaisha, Tokyo, Japan

[21] Appl. No.: 833,523

[22] Filed: Apr. 7, 1997

Related U.S. Application Data

[63] Continuation of Ser. No. 491,715, Jun. 19, 1995, abandoned.

[30] Foreign Application Priority Data

Jun. 20, 1994 [JP] Japan ................................. 6-160553

[51] Int. Cl.$^6$ ................................................ H04N 5/235
[52] U.S. Cl. ..................................... 348/364; 348/367
[58] Field of Search .................................. 348/362, 363, 348/364, 365, 366, 297, 298, 299, 296, 229, 231, 367; 396/96, 213, 236, 257, 259, 260, 262; H04N 5/235

[56] References Cited

U.S. PATENT DOCUMENTS

| | | |
|---|---|---|
| 4,868,667 | 9/1989 | Tani et al. . |
| 4,984,088 | 1/1991 | Tani et al. . |
| 5,101,276 | 3/1992 | Ohta ........................... 348/229 |
| 5,282,041 | 1/1994 | Tani et al. . |
| 5,455,621 | 10/1995 | Morimura ..................... 348/229 |
| 5,589,880 | 12/1996 | Tsukui ......................... 348/229 |

FOREIGN PATENT DOCUMENTS

| | | |
|---|---|---|
| 6482863 | 3/1989 | Japan . |
| 2164186 | 6/1990 | Japan . |

*Primary Examiner*—Andrew Faile
*Assistant Examiner*—Tuan V. Ho
*Attorney, Agent, or Firm*—Greenblum & Bernstein P.L.C.

[57] ABSTRACT

An exposure control device of a still-video camera has a CCD and a photoreceptor element for sensing a photometry value of an object. First, the camera is aimed at the main object in such a manner that the main object is positioned in the center of the frame, and a first photometry value is obtained. Then, the aim of the camera is changed so that the main object is offset from the center of the frame, and a second photometry value is obtained. A provisional exposure is carried out in accordance with an aperture value and an electric charge accumulating time which are obtained based on the second photometry value, and thus an exposure value is obtained. A ratio of the proper exposure value and the provisional exposure value is obtained. A normal exposure is carried out in accordance with the aperture value and a normal electric charge accumulating time $TT=T\times(E0/E2)\times(L2/L1)$, where T represents the electric charge accumulating time, E0 represents the exposure value, E2 represents the provisional exposure value, L2 represents the second photometry value, L1 represents the first photometry value, and TT represents the normal electric charge accumulating time.

21 Claims, 19 Drawing Sheets

Fig. 2
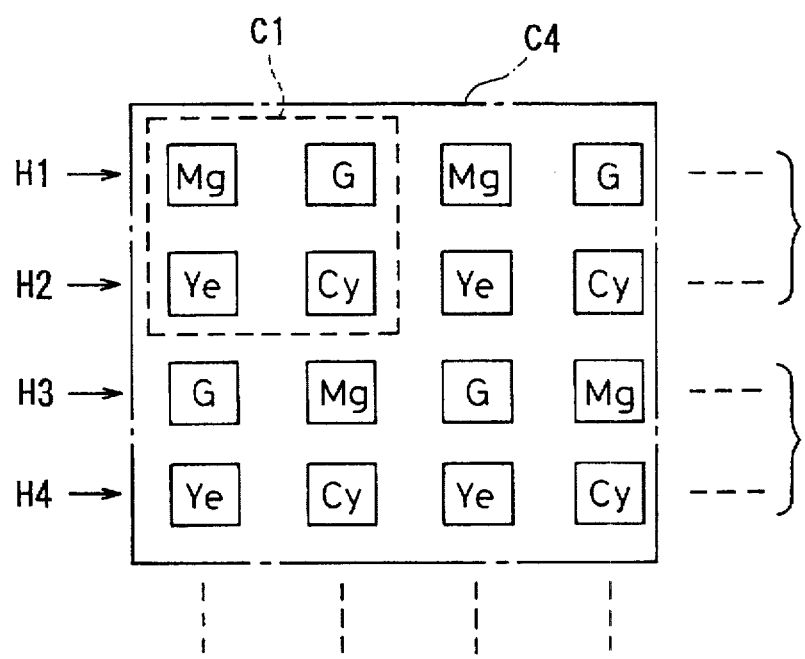
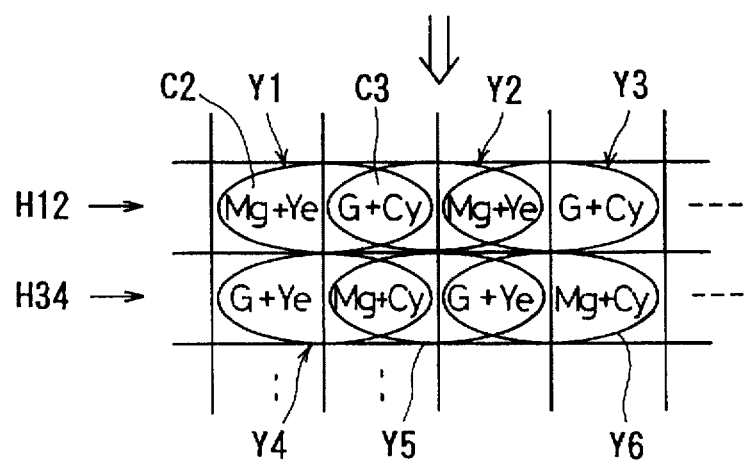

EXPOSURE CONTROL DEVICE

This application is a continuation, of application Ser. No. 08/491,715, filed Jun. 19, 1995, now abandoned.

BACKGROUND OF THE INVENTION

1. Field of the Invention

The present invention relates to a still-video camera by which a still image is obtained through a solid state imaging device such as CCD.

2. Description of the Related Art

A solid state imaging device has a narrower latitude of exposure in comparison with silver halide film, and needs highly accurate exposure control. Therefore, in an exposure of a still-video camera, an aperture value and an electric charge accumulating time are determined as follows. Namely, photometry is performed using a photoreceptor element while a release button is partly depressed, and based on the photometry value, the aperture value and the electric charge accumulating time are obtained. Then, by fully depressing the release button, a provisional exposure is carried out in accordance with the aperture value and the electric charge accumulating time, and the exposure amount obtained by the provisional exposure is compared with a proper exposure amount (a fixed value) determined by a sensitivity of the CCD and an object brightness. Based on this comparison result, a correction value is applied to the electric charge accumulating time and a normal exposure is obtained.

On the other hand, when a photographer takes a picture by intentionally offsetting a main object from the center of the frame, the process by which photography is carried out in a camera using silver halide film is described below. Namely, the release button is partly depressed to obtain a photometry value while the direction of the camera lens is set in such a manner that the main object is positioned at the center of the frame. Then, the direction of the camera lens is changed so that the main object is positioned at a desired position in the frame, and then the release button is fully depressed.

In a conventional still-video camera, however, as described above, a provisional exposure is carried out by fully depressing the release button, and photometry, which has been carried out while the release button is partly depressed, is ignored. Therefore, photography, in which a photometry value is fixed based on a main object positioned offset from the center of the frame, cannot be performed. Thus, the exposure, based on the main object, may be performed improperly.

SUMMARY OF THE INVENTION

Therefore, an object of the present invention is to provide an exposure control device, by which, when a main object is positioned offset from the center of the frame, an exposure is properly performed.

According to the present invention, there is provided an exposure control device comprising an imaging device, photometry measuring device, provisional exposing device, obtaining device, calculating device, and normal exposing device.

The imaging device is provided for forming an object image. The photometry measuring device is provided for performing photometry measurements to obtain a first photometry value (L1) corresponding to a first object and a second photometry value (L2) corresponding to a second object. The provisional exposing device is provided for performing a provisional exposure in which the imaging device is provisionally exposed. The provisional exposure is performed in accordance with a first aperture value and a first electric charge accumulating time which are obtained based on the second photometry value (L2), so that a provisional exposure value (E2) is obtained in accordance with an output signal of the imaging device. The obtaining device obtains a proper exposure value (E0) in accordance with characteristics of the camera. The calculating device calculates a ratio (E0/E2) of the proper exposure value (E0) and the provisional exposure value (E2). The normal exposing device is provided for performing a normal exposure in which the imaging device is normally exposed. The normal exposure is performed in accordance with a second aperture value and a normal electric charge accumulating time. The normal electric charge accumulating time is obtained based on at least the ratio (E0/E2) and the first photometry value (L1).

The first aperture value may be the same as the second aperture value, and the normal electric charge accumulating time (TT) may be obtained by TT=T×(E0/E2)×(L2/L1), wherein T is the first electric charge accumulating time.

The second aperture value and a second electric charge accumulating time (T2) may be obtained based on the first photometry value (L1), and the normal electric charge accumulating time (TT) may be obtained by TT=T2×(E0/E2).

BRIEF DESCRIPTION OF THE DRAWINGS

The present invention will be better understood from the description of the preferred embodiments of the invention set forth below, together with the accompanying drawings, in which:

FIG. 2 is a diagram showing an arrangement of color filters disposed on a light receiving surface of CCD;

DESCRIPTION OF THE PREFERRED EMBODIMENTS

Figure 1:
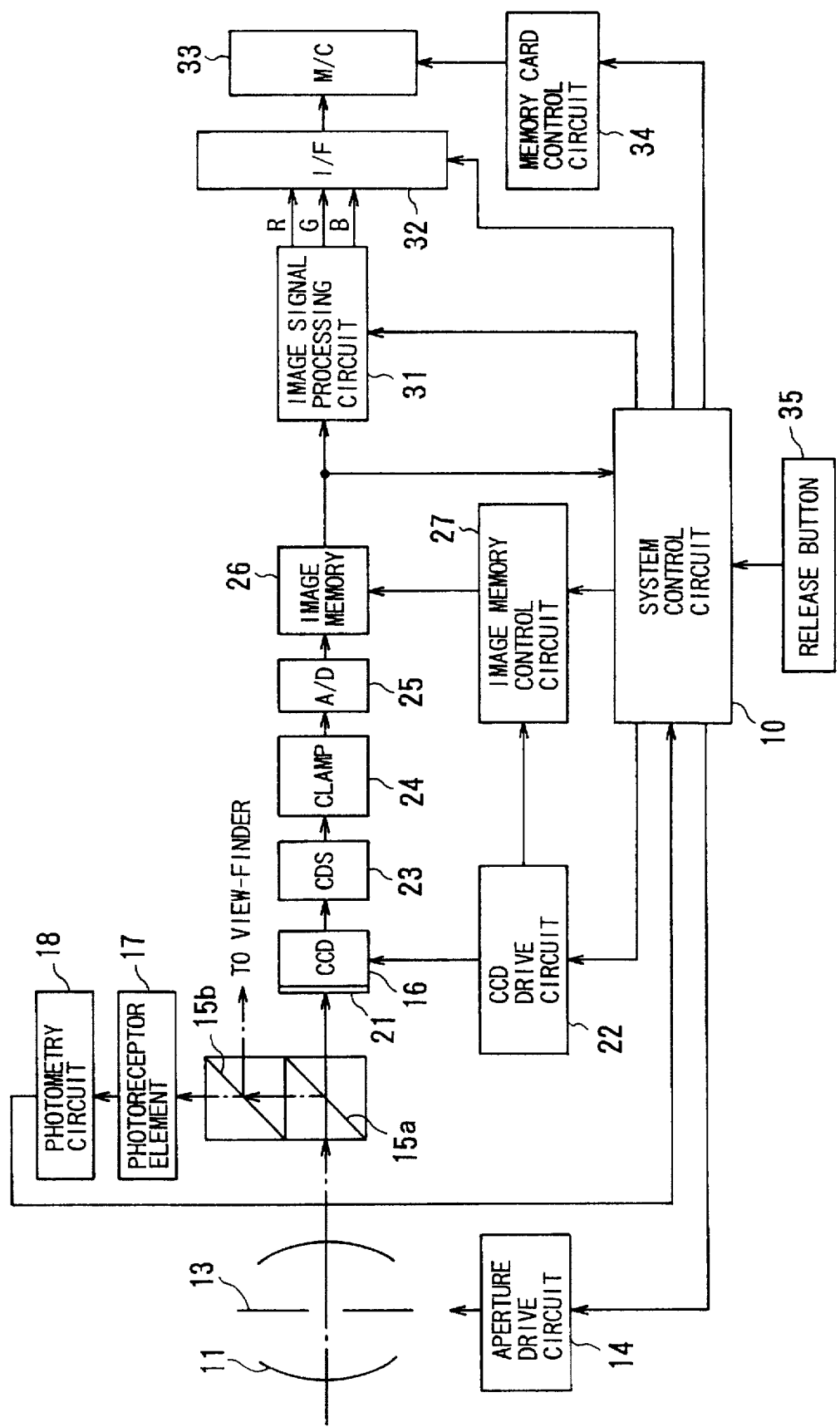
FIG. 1 is a block diagram showing a still-video camera having an exposure control device of a first embodiment of the present invention.

The present invention will now be described with reference to embodiments shown in the drawings.

FIG. 1 is a block diagram showing a still-video camera having an exposure control device of a first embodiment.

Overall, the still-video camera is controlled by a system control circuit 10, which includes a micro-computer.

A focusing lens 11 is controlled by a focusing lens drive circuit (not shown) to focus an image of an object to be photographed. An aperture 13 is controlled by an aperture drive circuit 14, to control the exposure, so that the opening of the aperture 13 is adjusted. The focusing lens drive circuit and the aperture drive circuit 14 are controlled by the system control circuit 10.

Image light passes through the focusing lens 11 and the aperture 13 and is divided by half mirrors 15a and 15b. The portion of image light passing through the half mirror 15a is led to a CCD 16. The portion of the image light reflected by the half mirror 15a and passing through the half mirror 15b is led to a photoreceptor element 17. The portion of the image light reflected by the half mirror 15b is lead to a view-finder (not shown).

The photoreceptor element 17 is provided for performing photometry, and is a photodiode having a rectangular shape with a side dimension of a few millimeters. A luminance signal obtained by the photoreceptor element 17 is inputted into a photometry circuit 18, so that the signal is converted into a photometry value and transmitted to the system control circuit 10.

The CCD 16 is a solid state imaging device, and has photodiodes corresponding to pixels aligned in a horizontal and a vertical direction of a reproduced image plane. An object image is formed on a light receiving surface of the CCD 16, so that pixel signals corresponding to the object are generated in the photodiodes. Note that a complementary color filter 21 with a checkerboard arrangement is provided on the light receiving surface.

The CCD 16 is driven by a CCD drive circuit 22 controlled by the system control circuit 10, so that image signals corresponding to the images formed on the CCD 16 are supplied to correlation-double-sampling (CDS) circuit 23. The image signals inputted to the CDS circuit 23 are processed so that reset noise is removed. The output signal of the CDS circuit 23 is clamped temporarily at a constant value by a clamp circuit 24, and is converted to a digital signal by an A-D converter 25. The digital image signal is stored in an image memory 26. The memory 26 has a storage capacity which is large enough to store pixel signals corresponding to one field of image.

Addresses in the image memory 26 where pixel signals are stored are controlled by an image memory control circuit 27. Namely, the image memory control circuit 27 is controlled by the CCD drive circuit 22 and the system control circuit 10, so that writing addresses where the pixel signals are written in the image memory 26, and reading addresses where the pixel signals are read from the image memory 26, are controlled.

The pixel signals read out from the image memory 26 are inputted into an image signal processing circuit 31, and are subjected to a predetermined process so that the pixel signals are converted to R-, G- and B-signals. These R-, G- and B-signals are inputted into an interface circuit 32, where each is converted to a signal having a format suitable for recording on a memory card 33. The recording operation for recording the R-, G- and B-signals onto the memory card 33 is carried out by a memory card control circuit 34. The image signal processing circuit 31, the interface circuit 32 and the memory card control circuit 34 are controlled by the system control circuit 10.

A release button 35 is connected to the system control circuit 10. When the release button 35 is partly depressed, a photometry switch is turned ON, and photometry and distance measurements are performed. When the release button 35 is fully depressed, a release switch is turned ON to carry out a photographing operation, and a recording operation of the image signals onto the memory card 33 is carried out.

FIG. 2 shows the arrangement of the complementary color filter 21 disposed on the light receiving surface of the CCD 16. In the color filter 21, filter elements for passing magenta (Mg), yellow (Ye), cyan (Cy) and green (G) light are arranged alternately in a regular manner in a checkerboard (or matrix) arrangement. Namely, for every four light-sensitive elements which are arranged in a 2×2 matrix encircled by a broken line C1, one each of a magenta (Mg), a green (G), a yellow (Ye) and a cyan (Cy) filter element are provided, each of which has different spectral characteristics from the other.

In this embodiment, an operation for reading the pixel signals from the CCD 16 is performed according to a so-called two-lines-addition reading method, in which the pixel signals of a line indicated by reference H1 and the pixel signals of a line indicated by reference H2 are added to each other, and then the added signals are stored in the image memory 26 in a form indicated by reference H12. Similarly, two lines of pixel signals indicated by references H3 and H4 are added to each other, and are stored in the image memory 26 in a form indicated by reference H34. Regarding the four pixel signals encircled by the broken line C1, for example, magenta (Mg) and yellow (Ye) signals added to each other (reference C2) are stored in the image memory 26, and green (G) and cyan (Cy) signals added to each other (reference C3) are stored in the image memory 26.

A luminance signal Y is obtained by adding four pixel signals of Mg, G, Ye and Cy adjacent to each other. Namely, according to the formula, $$Y = Mg + G + Ye + Cy \qquad (1)$$

one luminance signal for example Y1 is obtained by adding a signal (Mg+Ye) indicated by reference C2 and a signal (G+Cy) indicated by reference C3.

An exposure value E2 corresponding to a predetermined area of the CCD 16 is the mean value of the luminance signals in the area. The exposure value E2 of 16 pixels encircled by a chained line C4, for example, is a mean value of six luminance signals Y1 through Y6 obtained from the pixel signals, and is obtained by the formula $$E2 = (Y1 + Y2 + Y3 + Y4 + Y5 + Y6)/6 \qquad (2)$$

Figure 3:
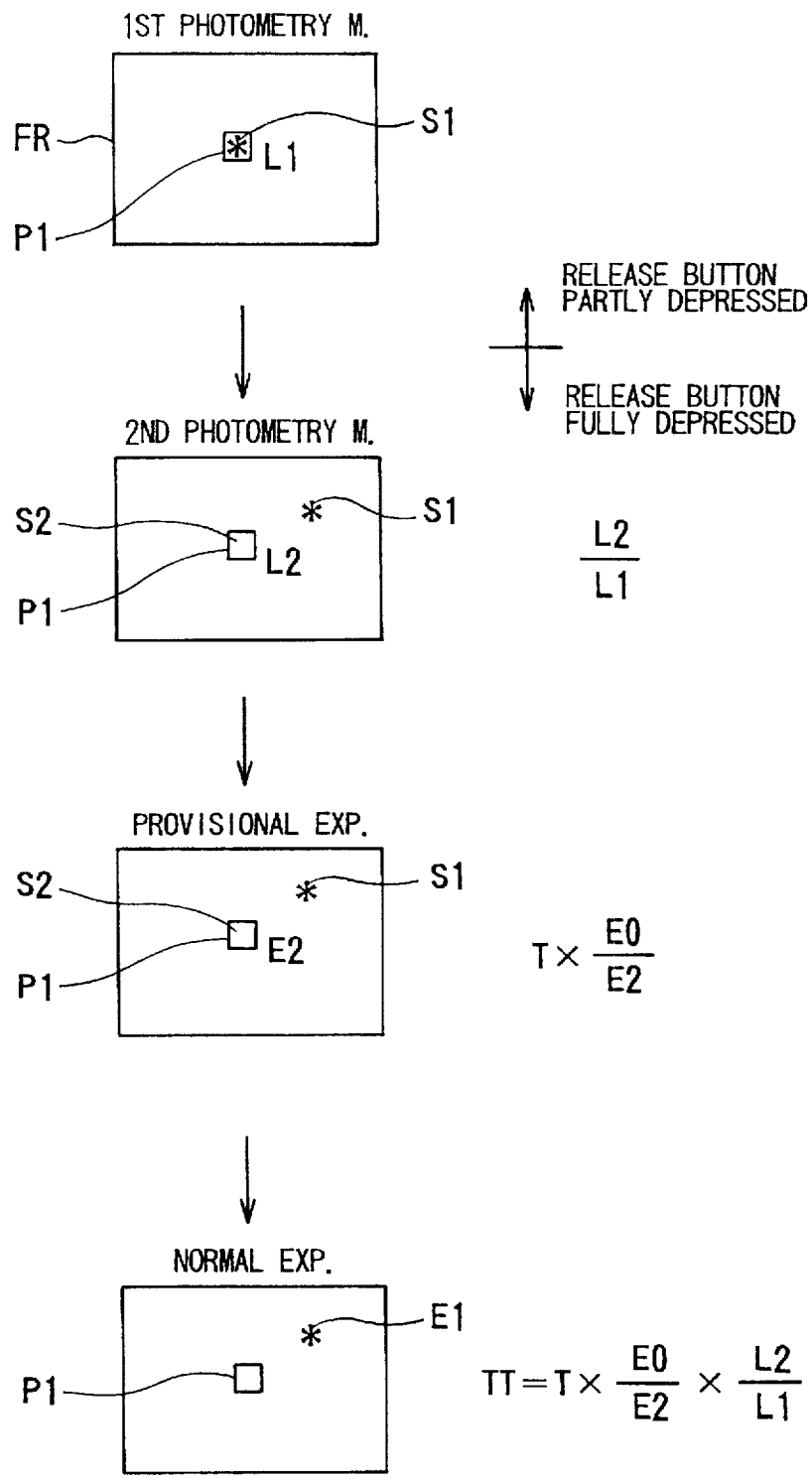
FIG. 3 is a view schematically showing an operation for determining a proper electric charge accumulating time in the first embodiment.

FIG. 3 is a view schematically showing an exposure control, i.e., an operation for determining a proper electric charge accumulating time in this embodiment.

The release button 35 is partly depressed, so that a photometry measurement is performed using the photoreceptor element 17 with the aperture 13 opened. The photometry measurement is performed with the photometry area P1, positioned at the center of the frame FR, adjusted so the main object S1 is in the center of the frame FR. At this photometry measurement, electric current corresponding to the luminance of the object S1 is outputted from the photoreceptor element 17, and is stored in a memory of the system control circuit 10 as a first photometry value L1.

Then, the aim of the camera is changed while keeping the release button 35 partly depressed, and thus the main object S1 is offset from the center of the frame FR. Then, the release button 35 is fully depressed after a second object S2 has been positioned in the photometry area P1, whereby another photometry measurement is performed by the photoreceptor element 17 to obtain a second photometry value L2, where the aperture 13 is fully open. The second photometry value L2 is stored in the memory of the system control circuit 10 similarly to the first photometry value L1.

Based on the second photometry value L2, an aperture value and an electric charge accumulating time by which a proper exposure would be obtained are calculated. The aperture value and the electric charge accumulating time are not necessarily an optimum exposure condition, but are a provisional proper exposure condition.

Then, a provisional exposure is performed to provisionally expose the CCD 16, and thus a provisional exposure value E2 is obtained based on pixel signals obtained from the photometry area P1 of the center of the frame FR. A proper exposure value E0 is obtained in accordance with characteristics of the still-video camera, such as sensitivity of the CCD 16, an amplification factor of the output signal of the CCD 16, and the second photometry value L2. In other words, the proper exposure value E0 is obtained based on characteristics of the camera, and is independent of any object at which the camera is aimed. If an exposure is carried out using a corrected electric charge accumulating time (T×E0/E2) obtained by multiplying a ratio E0/E2 of the proper exposure value E0 and the provisional exposure value E2 by the electric charge accumulating time T, the center of the frame FR will be properly exposed.

The main object S1 is, however, positioned offset from the center of the frame FR. Therefore, an electric charge accumulating time for obtaining a proper exposure value E1 for the main object S1 is obtained by multiplying the corrected electric charge accumulating time (T×E0/E2) by the ratio L2/L1 of the second photometry value L2 of the second object S2 and the first photometry value L1 of the first object S1. Namely, the normal electric charge accumulating time TT in a normal exposure is:

$$TT = T \times (E0/E2) \times (L2/L1) \quad (3)$$

Note that in this embodiment, the aperture value in the normal exposure is equal to the aperture value obtained based on the second photometry value L2.

Figure 4:
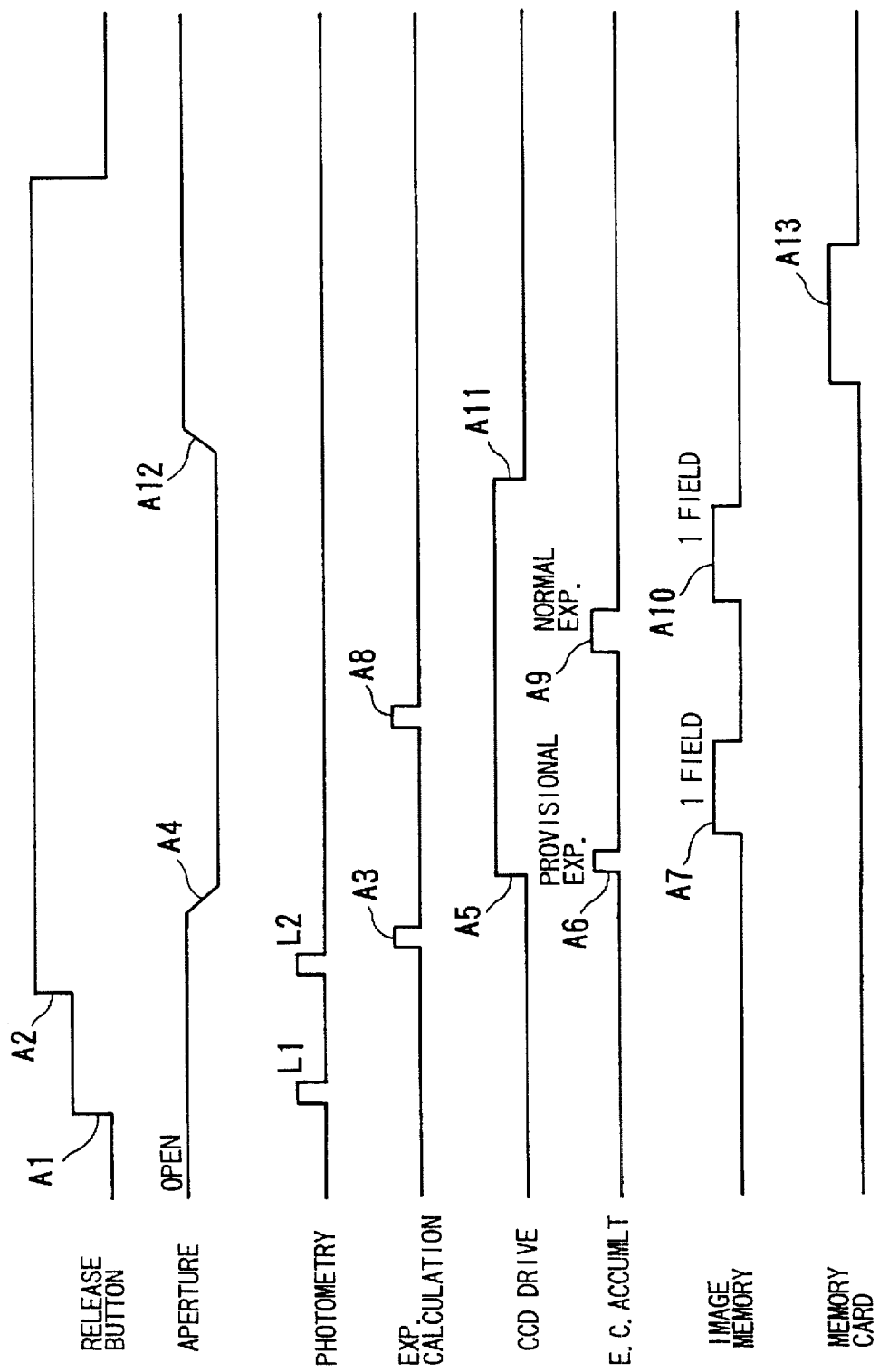
FIG. 4 is a timing chart showing an exposure control in the first embodiment.
Figure 5:
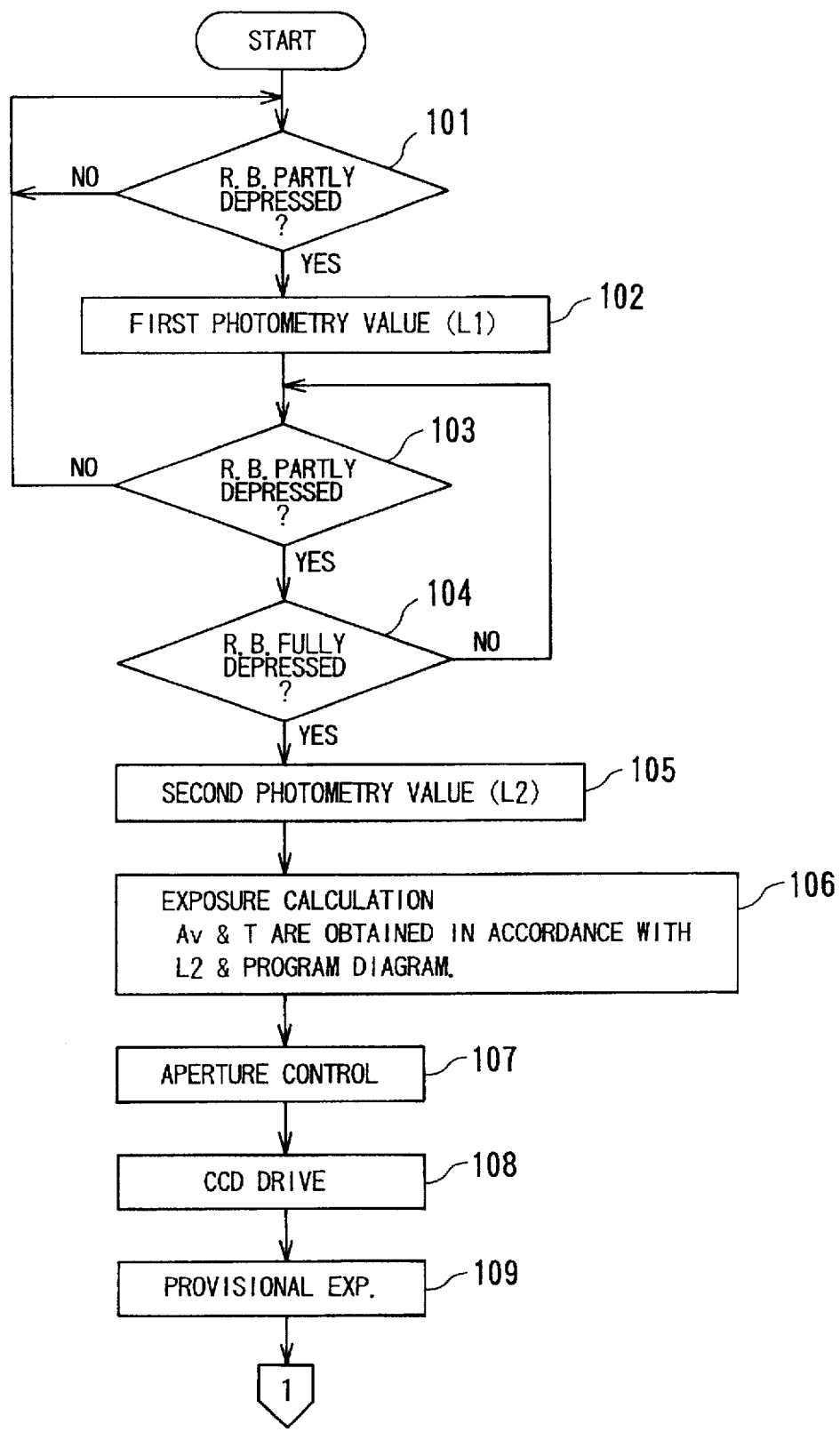
FIG. 5 is a first part of a flowchart of a program by which the exposure control is executed in the first embodiment.
Figure 6:
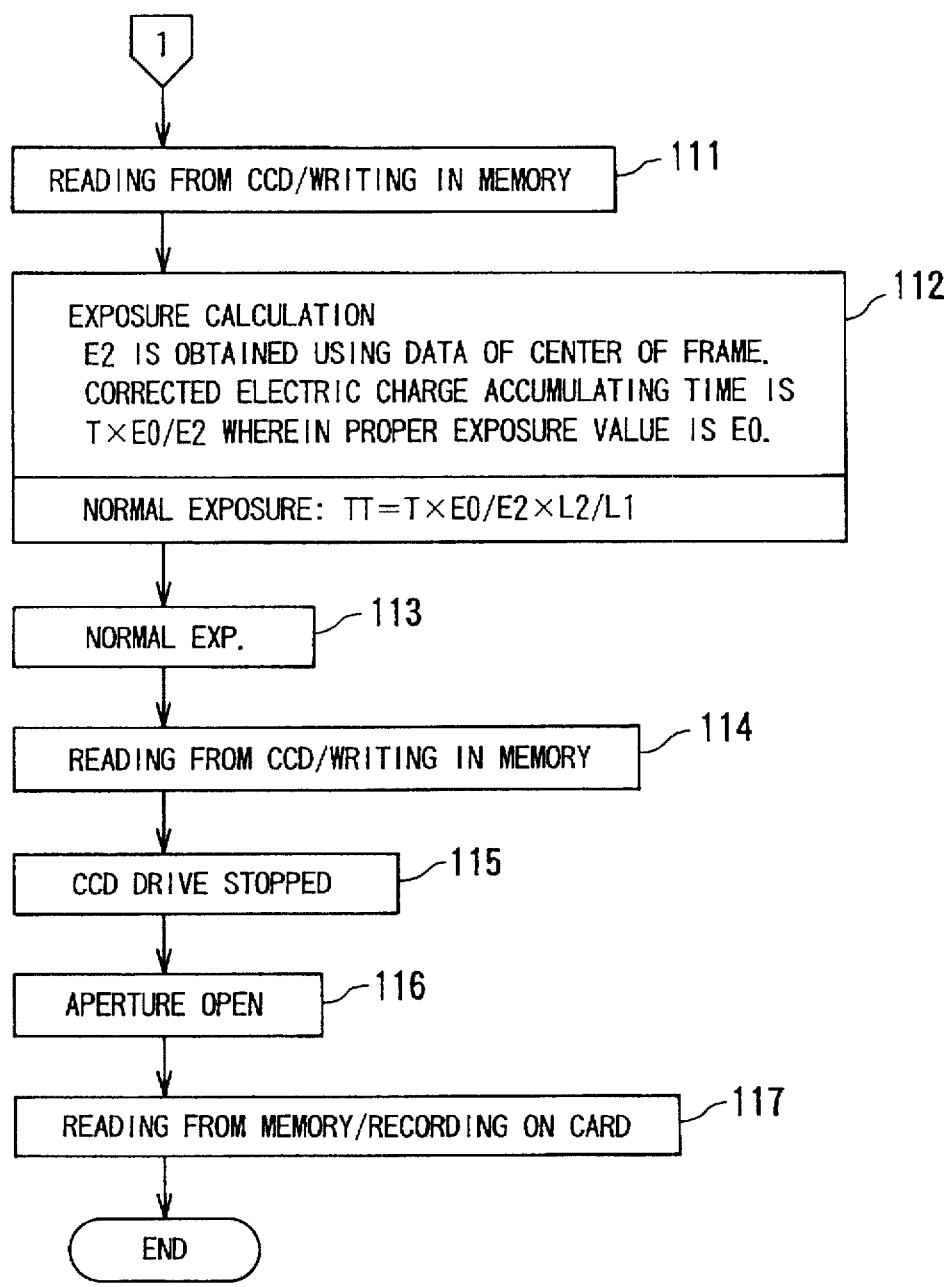
FIG. 6 is a second part of the flowchart shown in FIG. 5.

FIG. 4 is a timing chart showing an exposure control in the first embodiment, and FIGS. 5 and 6 show a flowchart of a program by which the exposure control is executed. With reference to these drawings and FIG. 3, the exposure control of the first embodiment is described.

First, the aperture 13 is fully opened, and the camera is aimed at the main object S1 in such a manner that the main object S1 is positioned at the center of the frame FR.

When it is sensed in Step 101 that the release button 35 has been partly depressed (reference A1), in Step 102, a first photometry value L1 is obtained based on an output signal of the photoreceptor element 17 and is stored in the memory of the system control circuit 10. In Step 103, it is determined whether or not the release button 35 has been kept partly depressed. If it is sensed that the release button 35 has been released, the process returns from Step 103 to Step 101, and thus Step 102 is again executed in which the first photometry value L1, stored in the memory, is updated. After the first photometry value L1 is sensed in Step 102, if the release button 35 has been kept partly depressed, Steps 103 and 104 are repeatedly executed. During this execution, the aim of the camera can be changed in such a manner that the main object S1 is offset from the center of the frame and the second object S2 is positioned at the center of the frame. Then the release button 35 is fully depressed (reference A2). As a result, the process goes from Step 104 to Step 105.

In Step 105, similarly to Step 102, a second photometry value L2 is obtained based on the output signal of the photoreceptor element 17, and is stored in the memory of the system control circuit 10. In Step 106, an exposure calculation is performed based on the second photometry value L2 (reference A3). Namely, an aperture value and an electric charge accumulating time T are obtained in accordance with a predetermined program diagram. In Step 107, the aperture 13 is controlled in such a manner that the opening degree of the aperture 13 becomes the aperture value obtained by the exposure calculation (reference A4).

In Step 108, the CCD 16 is driven (reference A5), so that accumulation of electric charges on the light receiving surface of the CCD 16 is started. In Step 109, a provisional exposure is performed in accordance with the electric charge accumulating time T, so that electric charges corresponding to the amount of light received from the object are accumulated in each photodiode of the CCD 16. In Step 111, one field's worth of pixel signals are read from the CCD 16 and are written in the image memory 26 (reference A7).

In Step 112, another exposure calculation is carried out to obtain a normal electric charge accumulating time TT in the normal exposure (reference A8). First, a provisional exposure value E2 is obtained using pixel signals of a predetermined area (a photometry area P1 of the center of the frame) included in the image memory 26. The corrected electric charge accumulating time is obtained by multiplying the electric charge accumulating time T of the provisional exposure by the exposure ratio E0/E2, wherein the proper exposure value E0 is obtained in accordance with a sensitivity of the CCD 16, an amplification factor of the output signal of the CCD 16, and the second photometry value L2. The normal electric charge accumulating time TT of the normal exposure is obtained by multiplying the corrected electric charge accumulating time by the ratio L2/L1 of the second and first photometry values.

In Step 113, the normal exposure of the CCD 16 is performed using the normal electric charge accumulating time TT and the aperture value obtained in Step 106 (reference A9). In Step 114, one field's worth of pixel signals are read from the CCD 16 and are written in the image memory 26 (reference A10). In Step 115, the drive of the CCD 16 is stopped (reference A11), and in Step 116, the aperture 13 is fully opened (reference A12). Then, in Step 117, one field's worth of pixel signals are read out from the image memory 26, and are subjected to a predetermined process and recorded on the memory card 33 (reference A13).

As described above, according to the first embodiment, even when the main object S1 is offset from the center of the frame FR, photography can be carried out in such a manner that the exposure value of the main object S1 is fixed at a proper value (i.e., an AE lock), and thus a still image is recorded. Such photography is similar to that of a camera using silver halide film, and is very simple. Further, according to the first embodiment, a specific circuit does not need to be provided in the still-video camera to perform the AE lock, and therefore, the increase in manufacturing cost of the still-video camera in which the AE lock can be performed is limited, and the circuits of the still-video camera need not be enlarged.

Note that the exposure calculation (Step 106 of FIG. 5) for the provisional exposure does not need to be performed in accordance with the second photometry value L2, and a photometry value L2' having a value slightly different from the photometry value L2 can be used in the exposure calculation. In such a case, the electric charge accumulating time TT in the normal exposure is obtained by:

$$TT=T\times(E0/E2')\times(L2'/L1) \qquad (4)$$

wherein the exposure value E2' is obtained in accordance with an aperture value and an electric charge accumulating time which are obtained based on the photometry value L2'.

Figure 7:
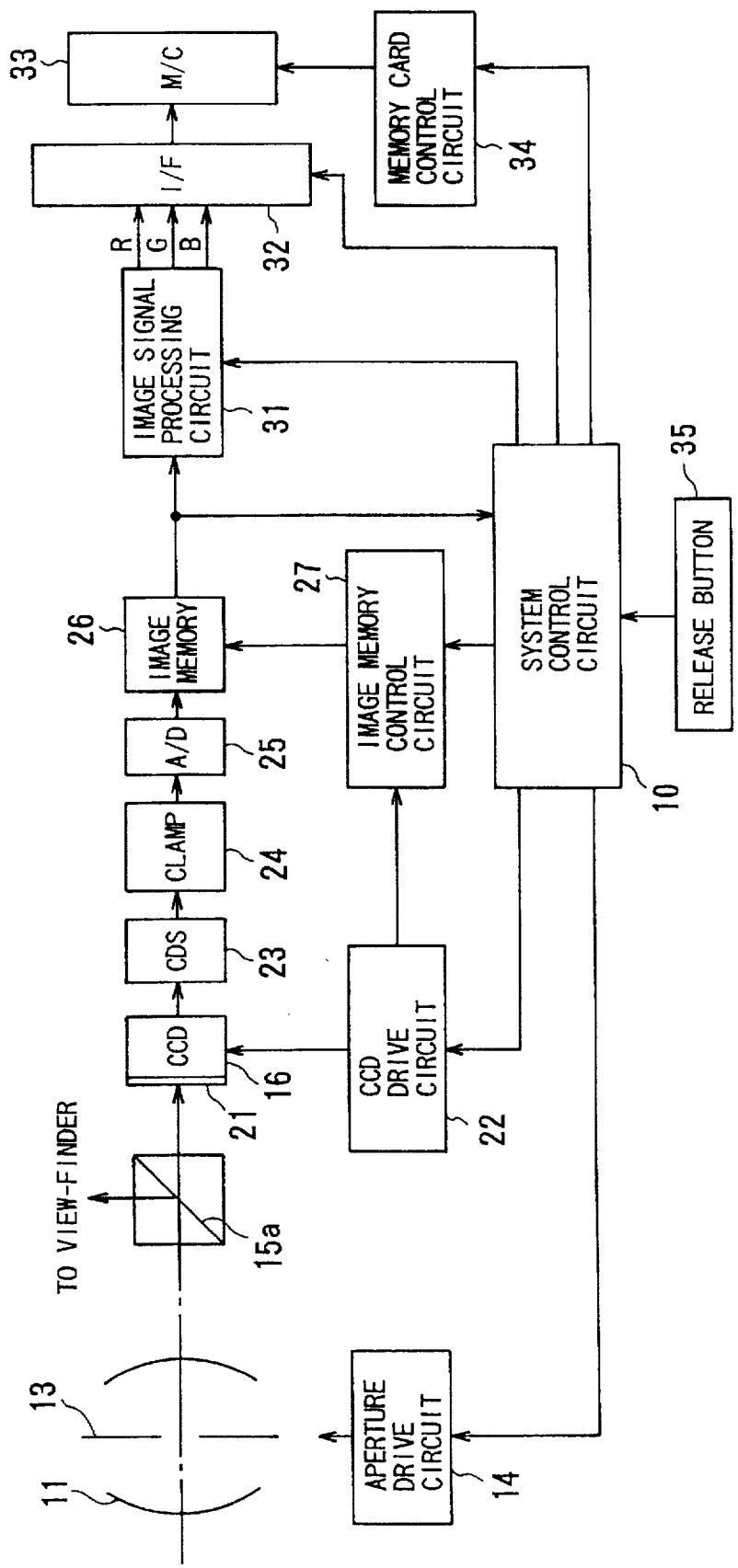
FIG. 7 is a block diagram showing a still-video camera having an exposure control device of a second embodiment.

FIG. 7 is a block diagram showing a still-video camera having an exposure control device of a second embodiment. Corresponding elements to those in the first embodiment are shown by the same reference numerals as FIG. 1, and their detailed explanation is omitted.

Although the photoreceptor element 17 and the photometry circuit 18 are provided for carrying out photometry in the first embodiment, these are not provided in the second embodiment. Namely, in the second embodiment, the first photometry value L1 and the second photometry value L2 are obtained based on an exposure value of the CCD 16. The half mirror 15b is not needed in the second embodiment; a portion of light divided by the half mirror 15a is led to the CCD 16, and the other portion of light is led to the view-finder (not shown). The other details of construction are the same as the first embodiment.

Figure 8:
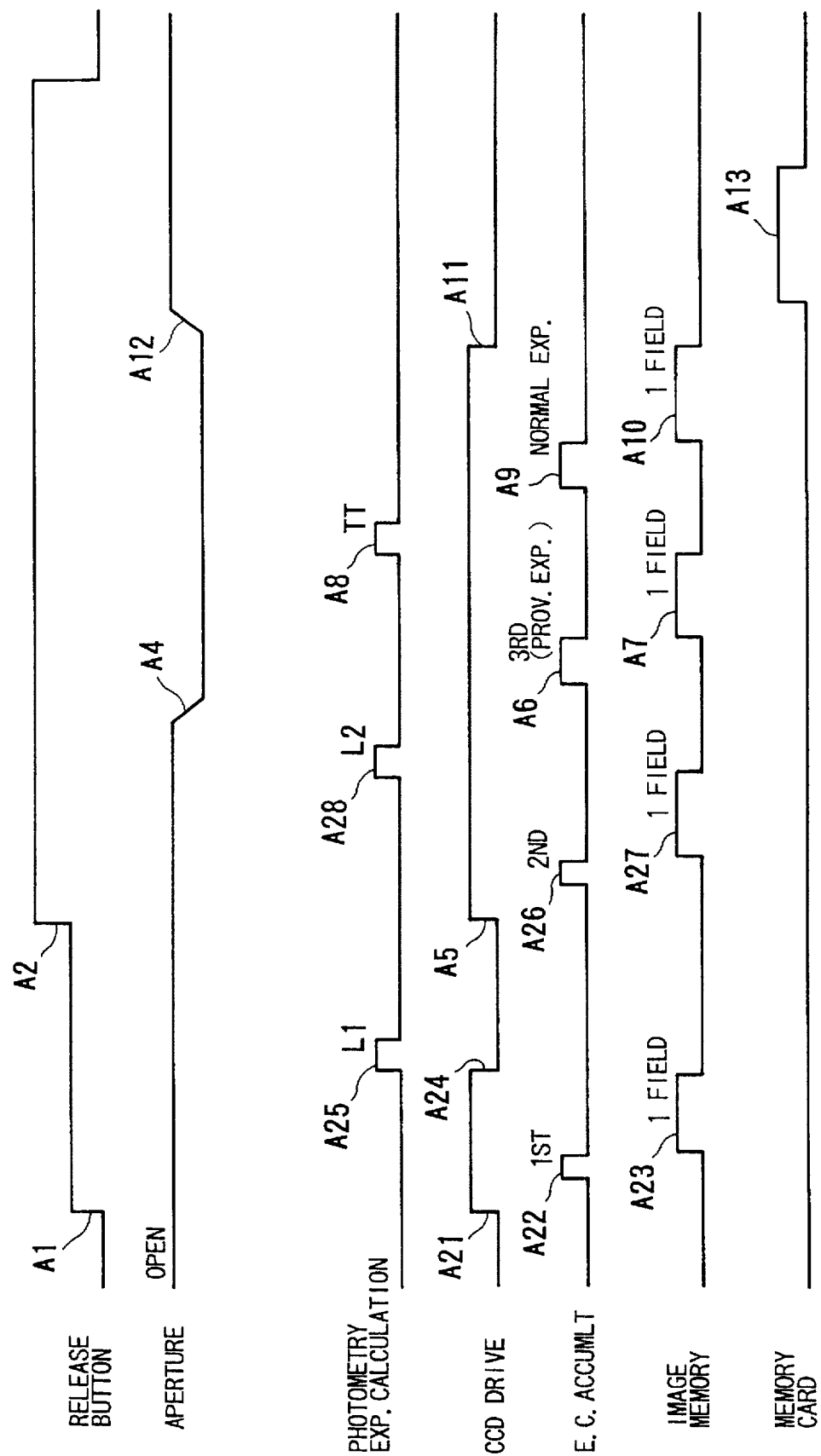
FIG. 8 is a timing chart showing an exposure control of the second embodiment.
Figure 9:
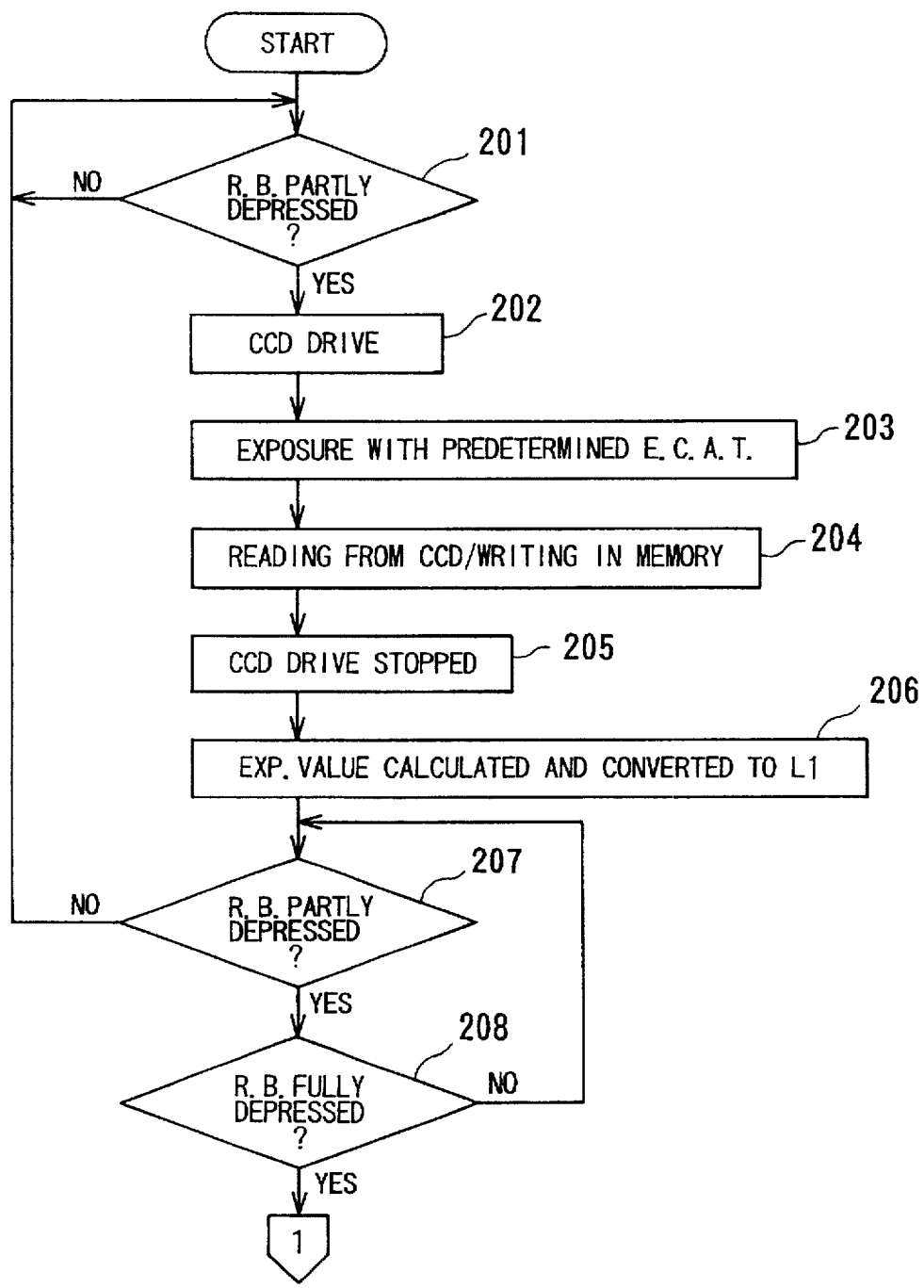
FIG. 9 is a first part of a flowchart of a program by which the exposure control is executed in the second embodiment.
Figure 10:
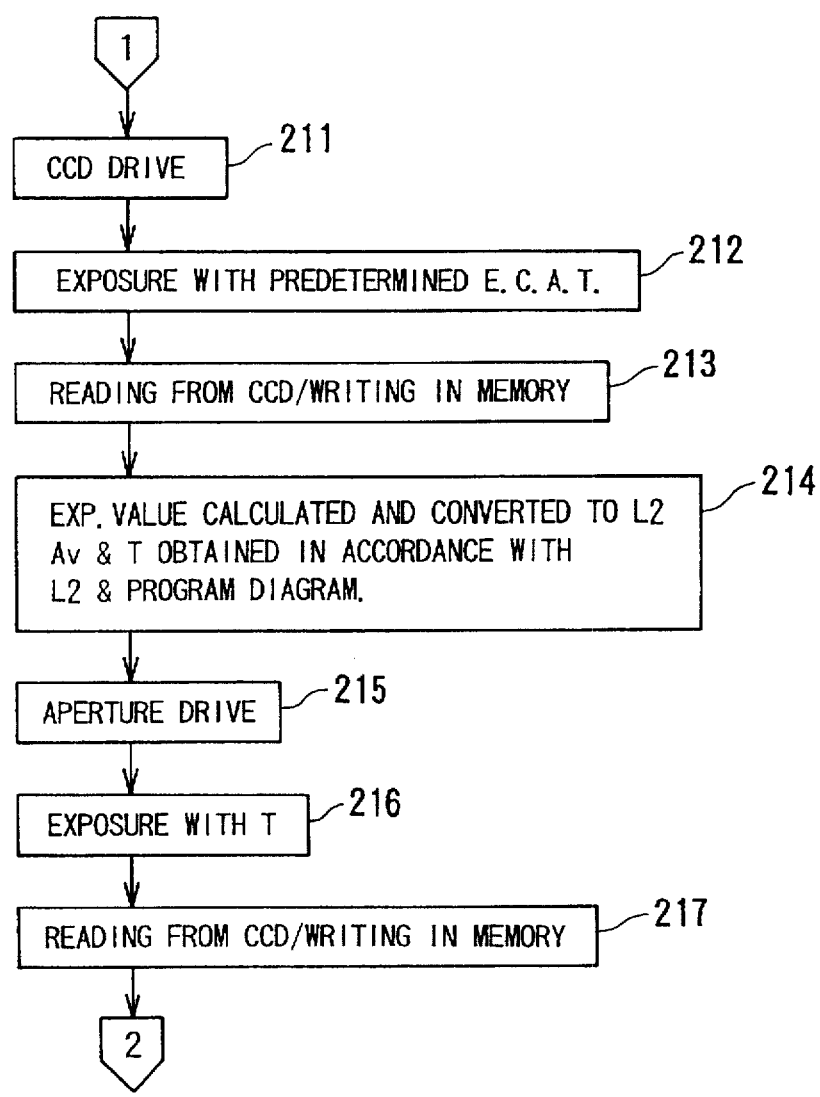
FIG. 10 is a second part of the flowchart shown in FIG. 9.
Figure 11:
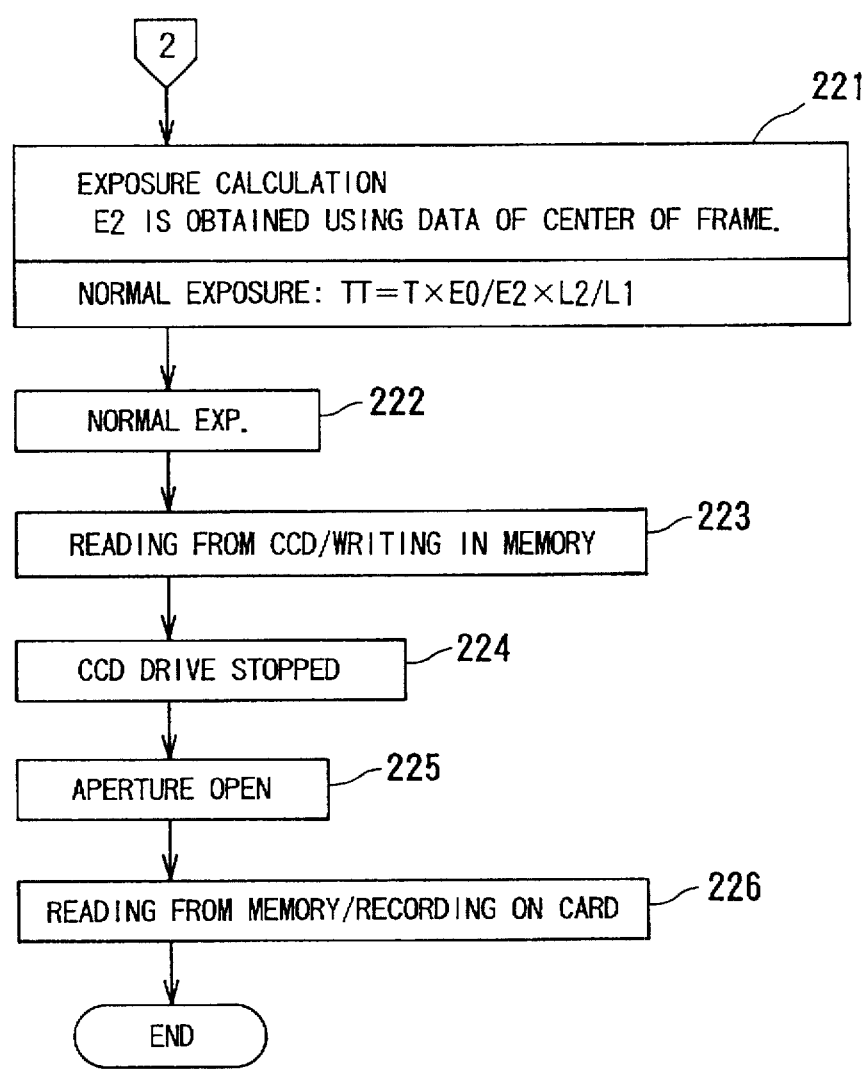
FIG. 11 is a third part of the flowchart shown in FIG. 9.

FIG. 8 is a timing chart showing an exposure control of the second embodiment, and FIGS. 9 through 11 show a flowchart of a program by which the exposure control is executed. With reference to these drawings, the exposure control of the second embodiment will be described hereinafter.

Similar to the first embodiment, first, the aperture 13 is fully opened, and the camera is aimed at the main object S1 in such a manner that the main object S1 is positioned at the center of the frame FR.

When it is sensed in Step 201 that the release button 35 is partly depressed (reference A1), in Step 202, the CCD 16 is driven (reference A21), so that the CCD 16 is exposed with a predetermined electric charge accumulating time (1/500 sec, for example). Namely, a first exposure is carried out (reference A22). In Step 204, one field's worth of pixel signals generated by the CCD 16 in the first exposure are read out from the CCD 16 and are written in the image memory 26 (reference A23). Then, in Step 205, the drive of the CCD 16 is stopped.

In Step 206, an exposure value is calculated based on pixel signals of the center of the frame, and is converted to the first photometry value L1 (reference A25). The first photometry value L1 is stored in the memory of the system control circuit 10. In Step 207, it is determined whether the release button 35 has been kept partly depressed. While the release button 35 is kept partly depressed, the aim of the camera can be changed from the main object S1 to another object. Then, if the release button 35 is fully depressed (reference A2), the process goes from Step 208 to Step 211.

In Step 211, the CCD 16 is again driven (reference A5). In Step 212, the CCD 16 is exposed with the same electric charge accumulating time as Step 203. Namely, a second exposure is carried out (reference A26). In Step 213, one field's worth of pixel signals generated in the CCD 16 by the second exposure are read from the CCD 16 and written in the image memory 26 (reference A27).

In Step 214, the exposure value is calculated based on pixel signals of the center of the frame, and is converted to the second photometry value L2 (reference A28). Further, based on the photometry value L2, the aperture value and the electric charge accumulating time T are obtained in accordance with a predetermined program diagram. In Step 215, the aperture 13 is controlled in accordance with the aperture value, and is set to a predetermined opening degree (reference A4). In Step 216, the CCD 16 is provisionally exposed with the electric charge accumulating time T, namely a third exposure is carried out (reference A6). In Step 217, one field's worth of pixel signals are read from the CCD 16 and written in the image memory 26 (reference A7).

In Step 221, similarly to Step 211 of FIG. 6, an exposure calculation is carried out to obtain an electric charge accumulating time in the normal exposure (reference A8). Namely, a provisional exposure value E2 is obtained using pixel signals of a predetermined area (corresponding to the center of the frame, for example) in the image memory 26. A normal electric charge accumulating time TT is obtained by multiplying the provisional electric charge accumulating time T by the exposure ratio E0/E2 and the photometry value ratio L2/L1.

In Step 222, the normal exposure of the CCD 16 is performed using the normal electric charge accumulating time TT and the aperture value obtained in Step 214 (reference A9). Operations in Steps 223 through 226 are the same as those in Steps 114 through 117.

As described above, according to the second embodiment, similarly to the first embodiment, the exposure value for the main object S1 offset from the center of the frame FR can be set to a proper value so that a still image is recorded. Further, the second embodiment is constructed in such a manner that the first and second photometry values L1 and L2 are obtained based on the output signal of the CCD 16. Therefore, the photoreceptor element for photometry and the photometry circuit are not needed, and thus the AE lock is performed by a circuit having a simpler construction than that of the first embodiment.

Figure 12:
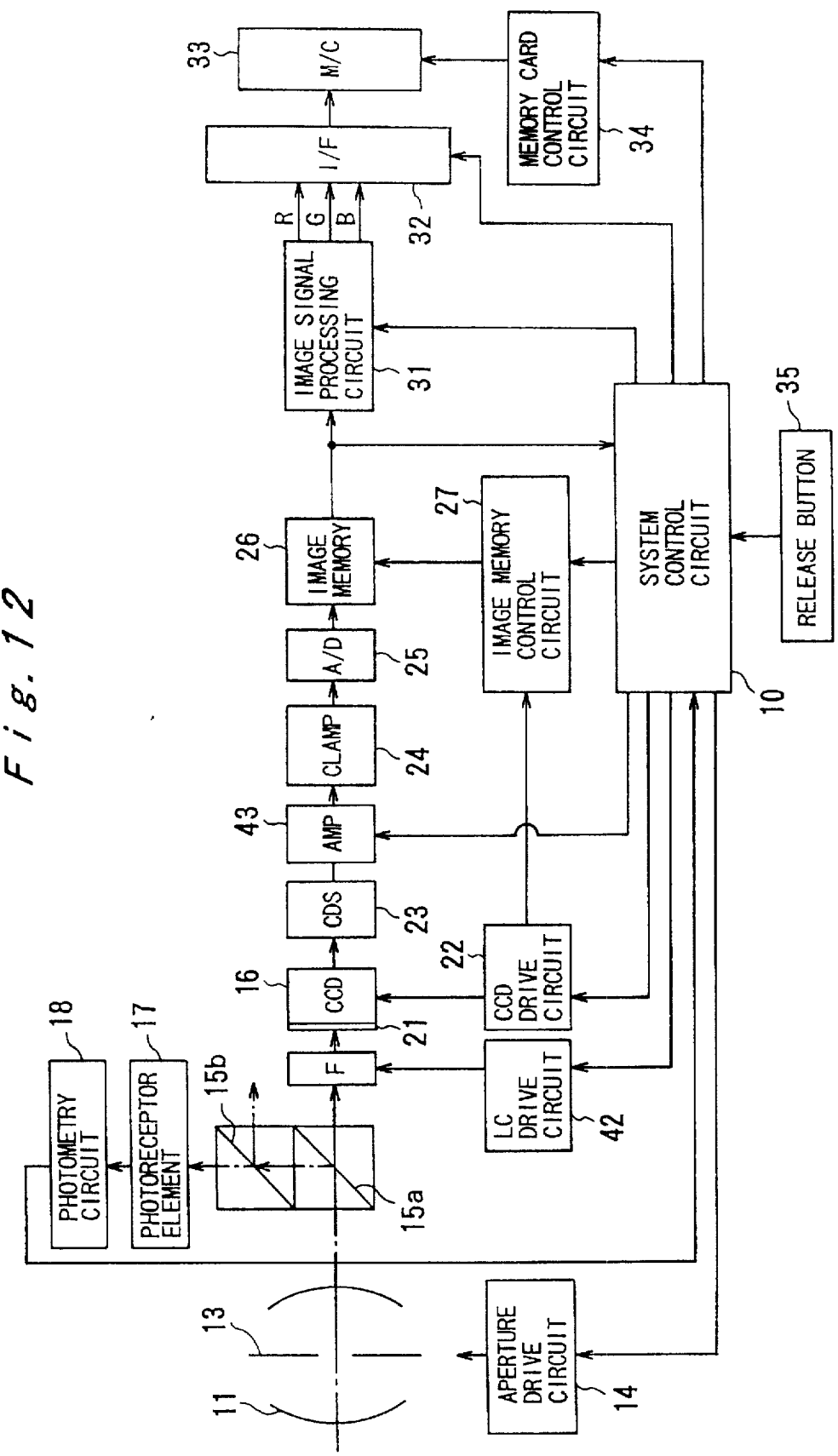
FIG. 12 is a block diagram showing a still-video camera having an exposure control device of a third embodiment.

FIG. 12 is a block diagram showing a still-video camera having an exposure control device of a third embodiment. Corresponding elements to those in the first embodiment are shown by the same reference numerals as FIG. 1, and their detailed explanation is omitted.

In the third embodiment, a monochromatic liquid crystal filter 41 is provided between the CCD 16 and the half mirror 15a. A density, i.e., a transmittance (1/B) of the liquid crystal filter 41 is changed in accordance with a control of a liquid crystal drive circuit 42, so that the amount of light entering the CCD 16 is controlled and restricted. The liquid crystal drive circuit 42 is operated based on a command signal outputted from the system control circuit 10. On the other hand, an amplifier 43 is provided between the CDS circuit 23 and the clamp circuit 24. The amplifier 43 amplifies an output signal of the CCD 16 with an amplification factor G, which is controlled by the system control circuit 10.

Figure 13:
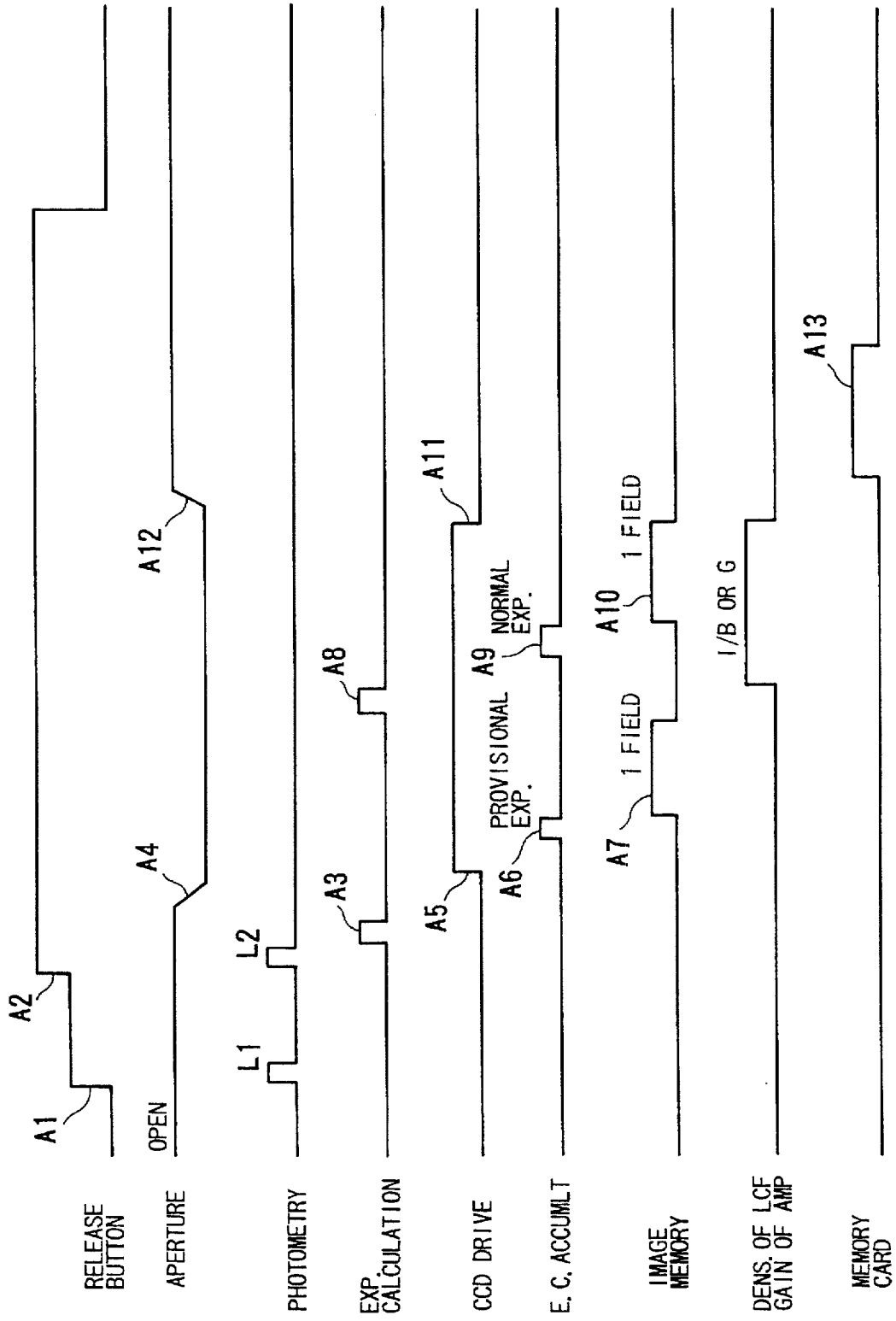
FIG. 13 is a timing chart showing an exposure control of the third embodiment.
Figure 14:
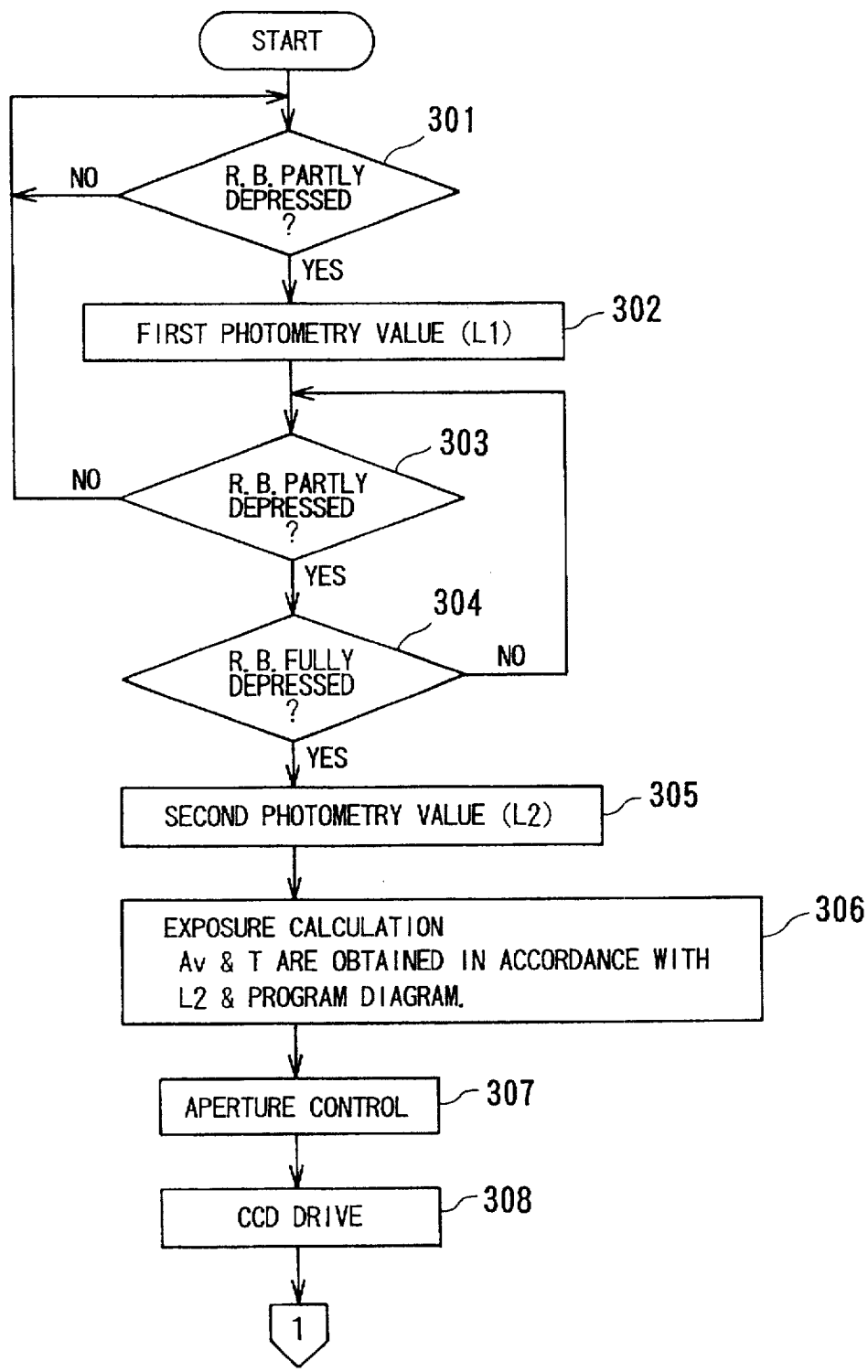
FIG. 14 is a first part of a flowchart of a program by which the exposure control is executed in the second embodiment.
Figure 15:
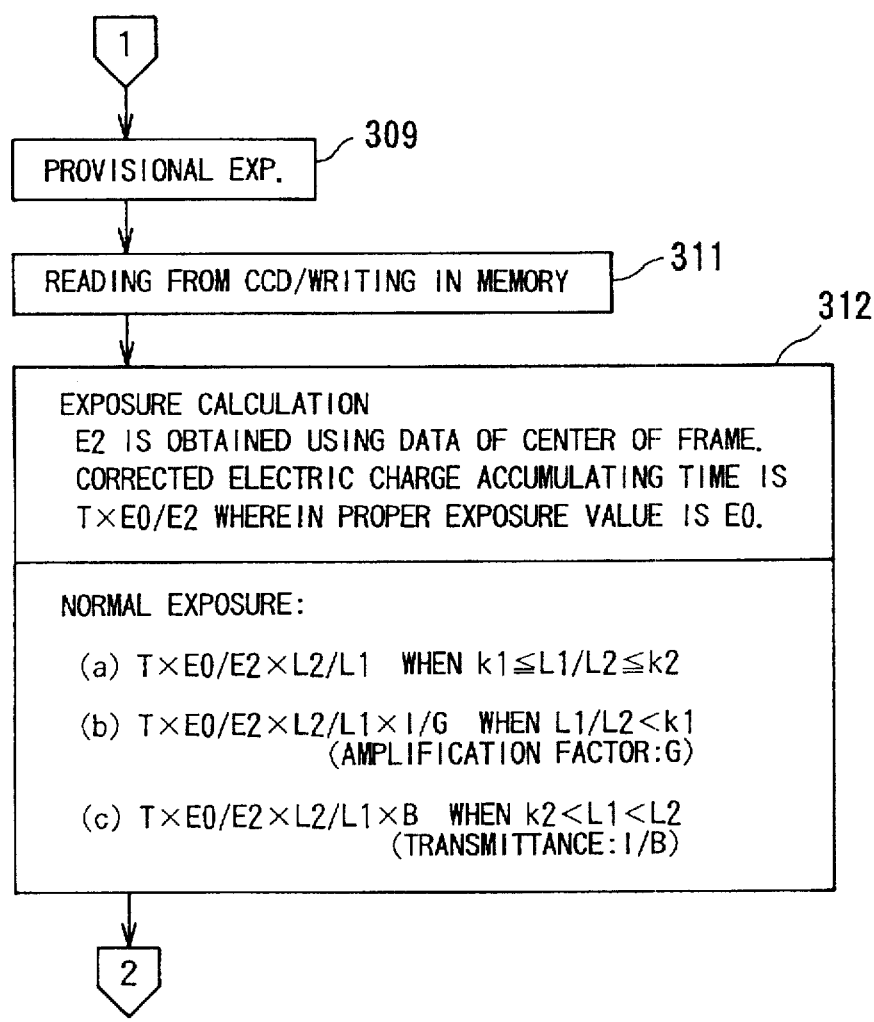
FIG. 15 is a second part of the flowchart shown in FIG. 14.
Figure 16:
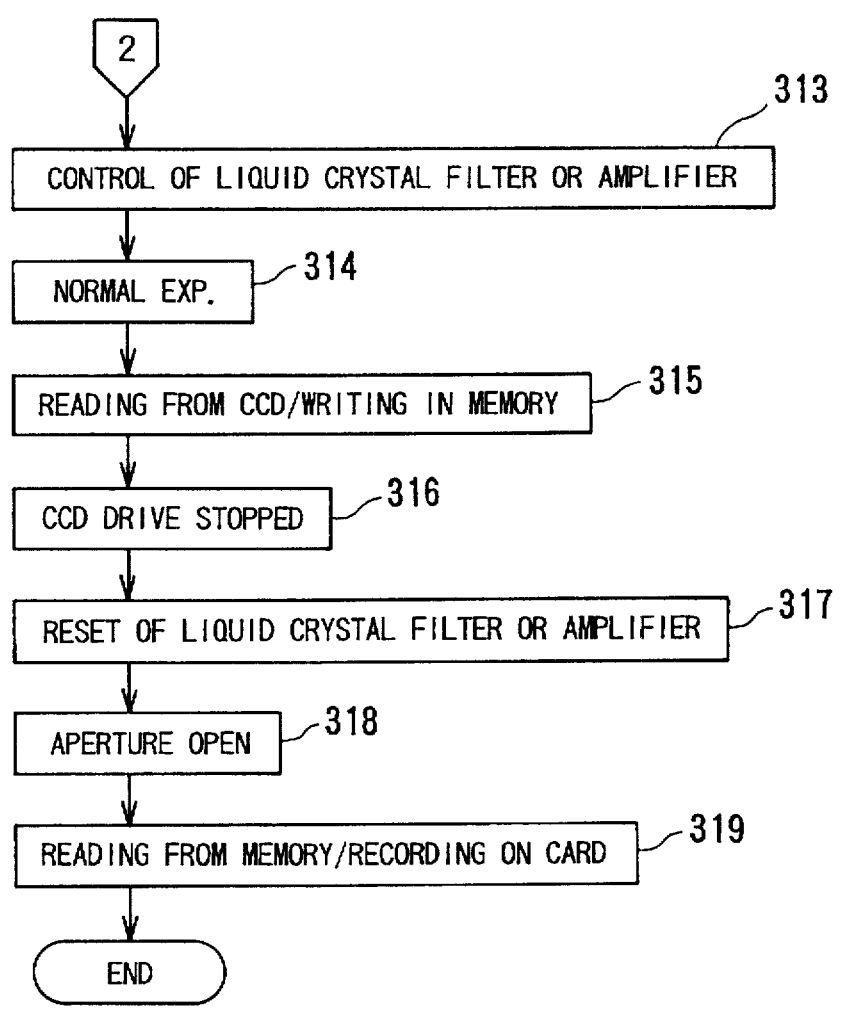
FIG. 16 is a third part of the flowchart shown in FIG. 14.

FIG. 13 is a timing chart showing an exposure control in the third embodiment, and FIGS. 14 through 16 show a flowchart of a program by which the exposure control is executed. With reference to these drawings, the exposure control of the third embodiment will be described.

Similar to the first and second embodiments, first, the aperture 13 is fully opened, and the camera is aimed at the main object S1 in such a manner that the main object S1 is positioned at the center of the frame FR.

Steps 301 through 309 and 311 are the same as Steps 101 through 109 and 111 shown in FIGS. 5 and 6. Namely, the first and second photometry values L1 and L2 are obtained based on the output signal of the photoreceptor element 17, and are stored in the memory of the system control circuit 10. Then, the exposure calculation is performed based on the second photometry value L2, and an aperture value and an electric charge accumulating time T are obtained in accordance with a predetermined program diagram. The aperture 13 is controlled in accordance with the result of the exposure calculation, and a provisional exposure is performed in accordance with the electric charge accumulating time T. One field's worth of pixel signals obtained by the provisional exposure are read out from the CCD 16 and written in the image memory 26.

In Step 312, an exposure calculation for obtaining an electric charge accumulating time TT of the normal exposure is performed. First, a provisional exposure value E2 is obtained using pixel signals of a predetermined area (corresponding to the center of the frame, for example) in the image memory 26. A corrected electric charge accumulating time is obtained by multiplying the electric charge accumulating time T of the provisional exposure by the exposure ratio E0/E2.

When a ratio L1/L2 of the first photometry value L1 and the second photometry value L2 is within a predetermined range, i.e., when:

$$k_1 \leq L1/L2 \leq k_2,$$

the exposure value for the main object S1 positioned offset from the center of the frame can be set to a proper value by controlling the electric charge accumulating time. Therefore, the electric charge accumulating time TT of the normal exposure is obtained by the formula (3). Note that, in this case, the liquid crystal filter 41 and the amplifier 43 are not operated simultaneously, and the transmittance (1/B) of the liquid crystal filter 41 and the amplification factor G of the amplifier 43 are set to 1, respectively.

When the ratio L1/L2 is smaller than a predetermined value, i.e., when $$L1/L2 < k_1,$$

since the luminance value of the main object S1 is too small, the exposure value for the main object cannot be set to a proper value only by setting the electric charge accumulating time TT to a long time. In other words, the electric charge accumulating time TT cannot have a value obtained by the formula (3), and the limit value of the electric charge accumulating time TT is $$TT = T \times (E0/E2) \times (L2/L1) \times (1/G) \quad (5)$$

Thus, by controlling the amplifier 43 so as to operate with the amplification factor G, pixel signals corresponding to the image, which is obtained by setting the exposure value of the main object S1 to a proper value, are stored in the image memory 26. Namely, the same effect as that in which a still image is obtained by the electric charge accumulating time TT set by the formula (3) is obtained, and the electric charge accumulating time TT according to the formula (5) is a normal electric charge accumulating time in the third embodiment.

In contrast with the above, when the ratio L1/L2 of the photometry value is larger than a predetermined value, i.e., when $$k_2 < L1/L2,$$

since the luminance value of the main object S1 is too large, the exposure value for the main object cannot be set to a proper value only by setting the electric charge accumulating time TT to a short time. Namely, the limit value of the electric charge accumulating time TT is $$TT = T \times (E0/E2) \times (L2/L1) \times B \quad (6)$$

Thus, by controlling the liquid crystal filter 41 so as to set the transmittance to 1/B, pixel signals corresponding to the image, which is obtained by setting the exposure value of the main object S1 to a proper value, are stored in the image memory 26. Namely, the electric charge accumulating time TT according to the formula (6) is also a normal electric charge accumulating time in the third embodiment.

In Step 313, the liquid crystal filter 41 or the amplifier 43 is controlled based on the calculation result in Step 312. Namely, in the third embodiment, either the liquid crystal filter 41 or the amplifier 43 is driven in accordance with a luminance of the main subject S1, which is to say these are not driven at the same time.

Operations in Steps 314 through 316 are the same as those in Step 113 through 115 shown in FIG. 6. In Step 317, the liquid crystal filter 41 or the amplifier 43 is reset to a non-operable condition. In Step 318, the aperture 13 is returned to a fully open condition. In Step 319, one field's worth of pixel signals are read out from the image memory 26, are subjected to a predetermined process, and are recorded in the memory card 33.

As described above, according to the third embodiment, similar to the first and second embodiments, the exposure value for the main object S1 offset from the center of the frame FR can be set to a proper value so that a still image is recorded. Further, according to the third embodiment, even when the exposure value of the main object S1 is not sufficiently controlled only by controlling the electric charge accumulating time (multiplied only by E0/E2 and L2/L1), since the difference between the first and second photometry values L1 and L2 is too large, the exposure value can be controlled by driving the liquid crystal filter 41 or the amplifier 43, and thus a desired still image can be obtained.

Note that, in the third embodiment, it is possible that the amplifier 43 can be omitted and that only the liquid crystal filter 41 is provided. Namely, in such a construction, the transmittance of the liquid crystal filter 41 is set to an intermediate value in usual photography, and is changed between the maximum and the minimum values in accordance with the ratio L1/L2 of the photometry values. Conversely, only the amplifier 43 may be provided, with the liquid crystal filter 43 being omitted. Namely, the amplification factor of the amplifier 43 is set to an intermediate value in usual photography, and is changed between the maximum and the minimum values in accordance with the ratio L1/L2 of the photometry values.

Figure 17:
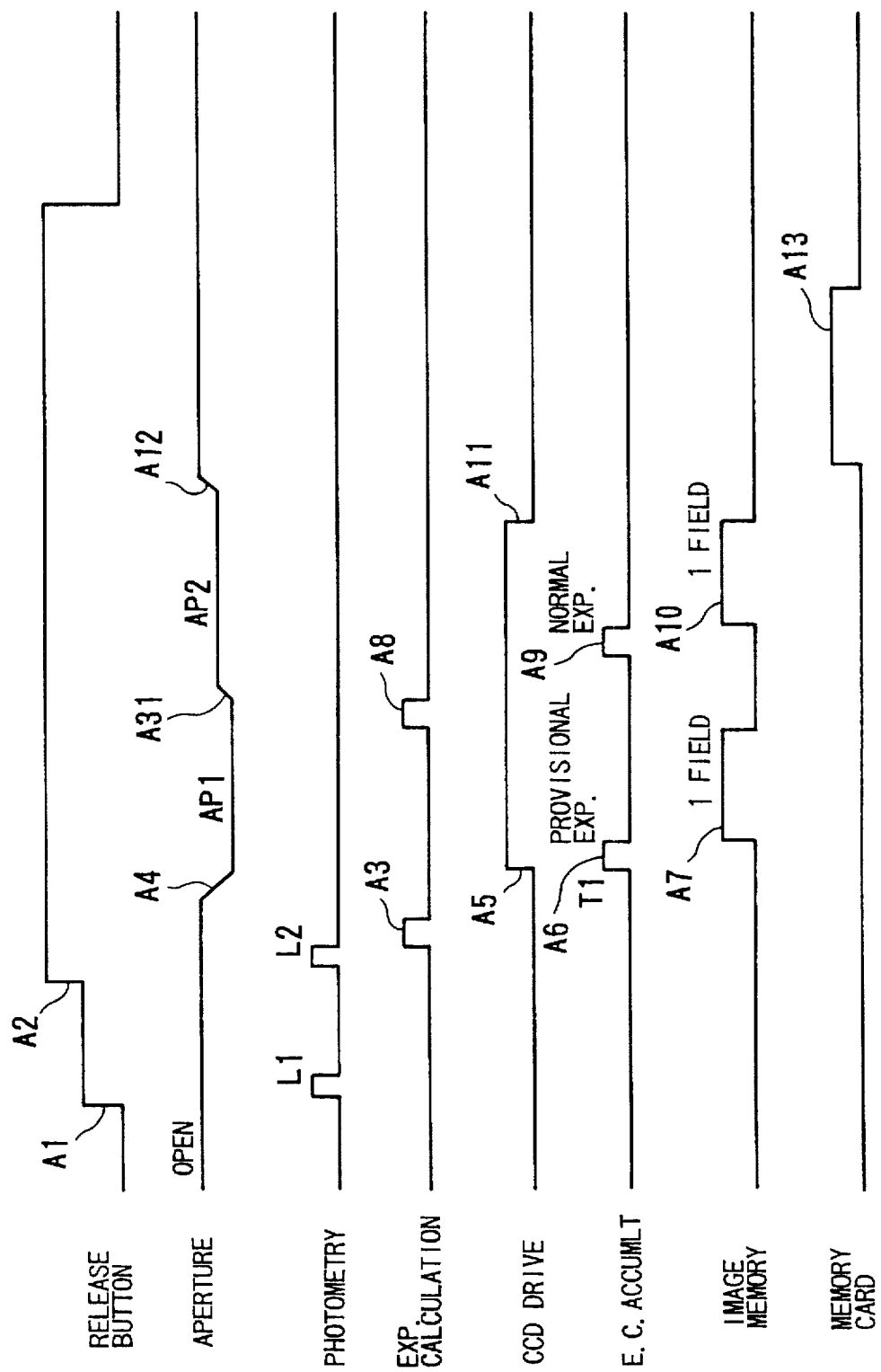
FIG. 17 is a timing chart showing an exposure control of a fourth embodiment.
Figure 18:
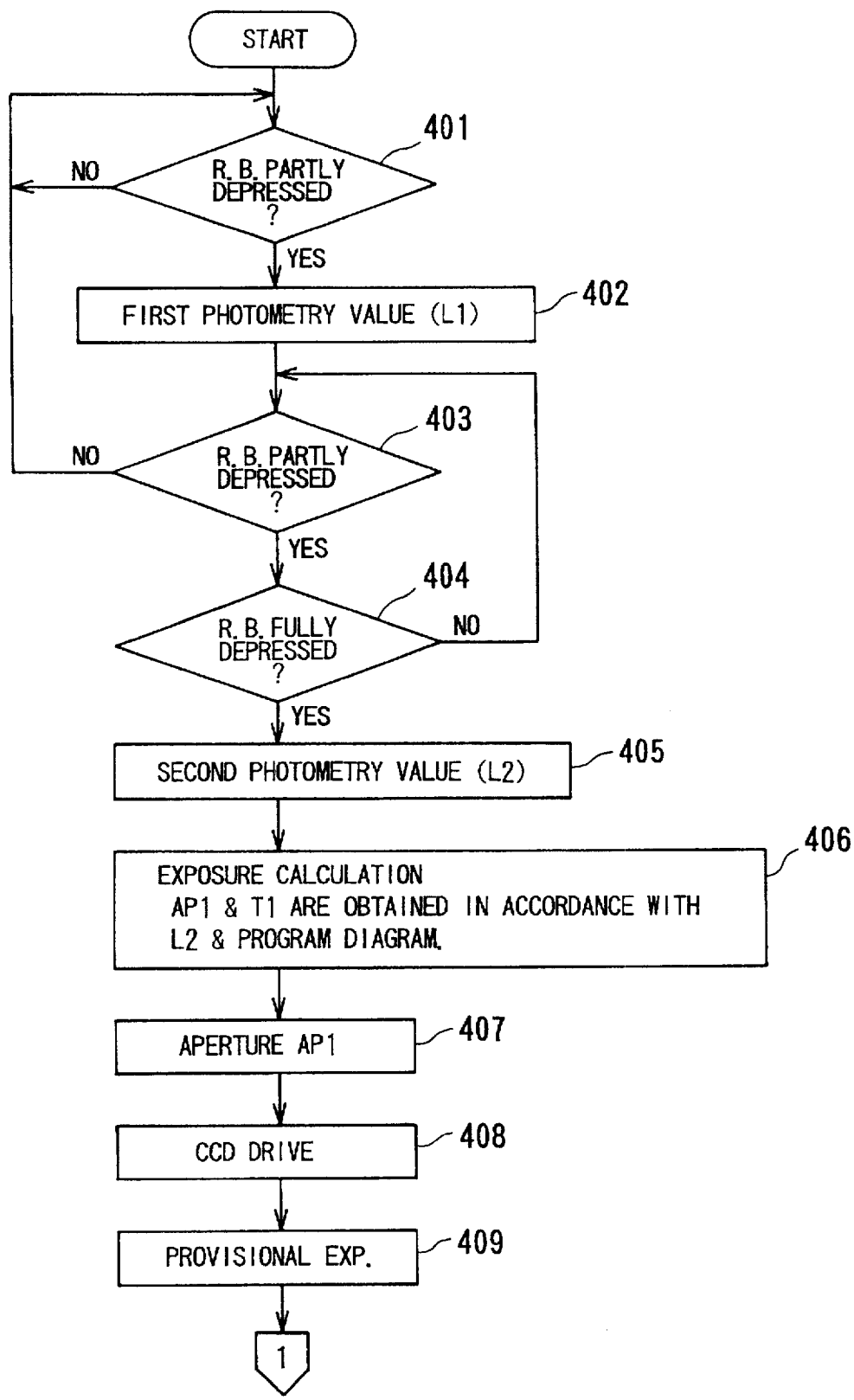
FIG. 18 is a first part of a flowchart of a program by which the exposure control is executed in the fourth embodiment.
Figure 19:
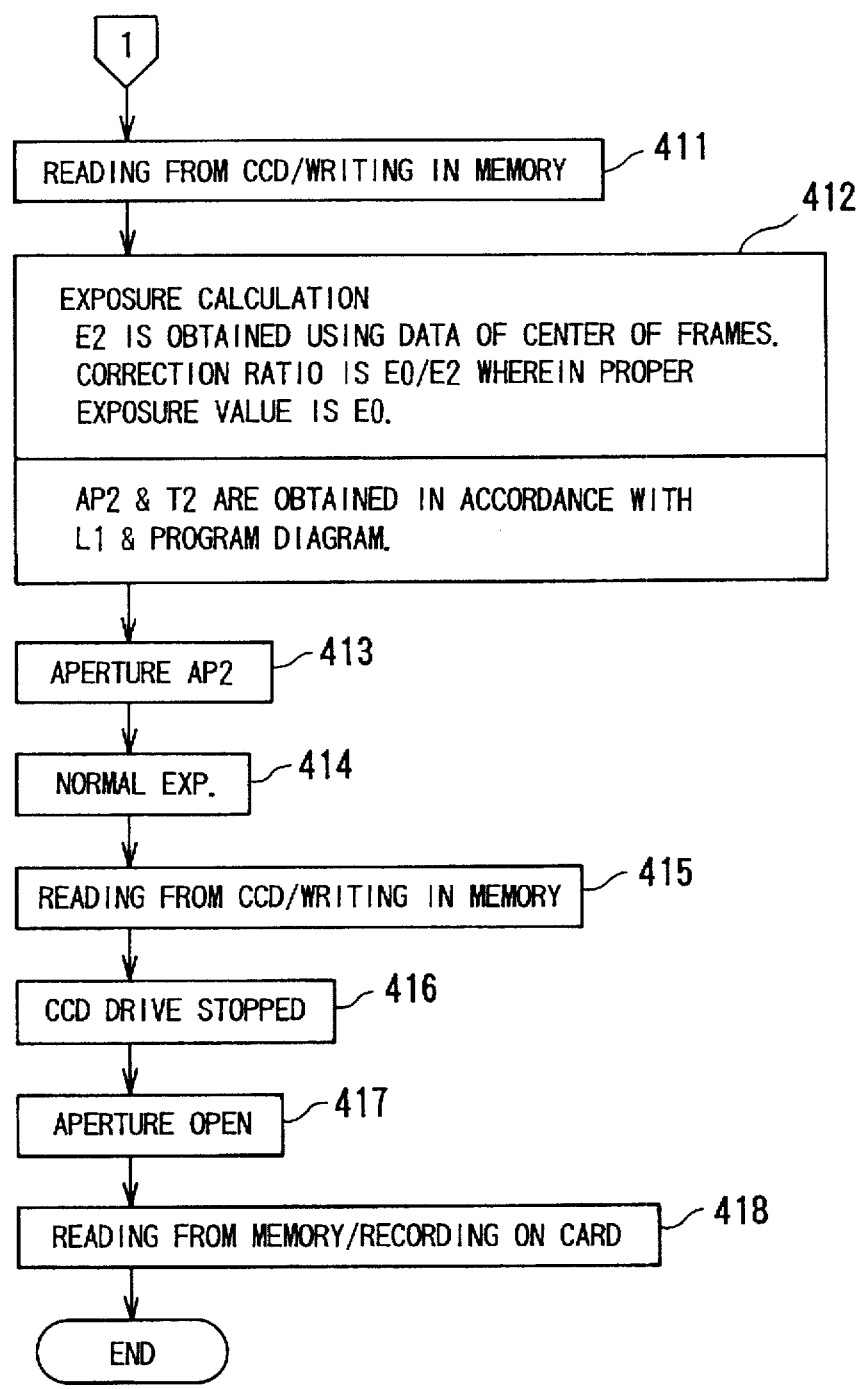
FIG. 19 is a second part of the flowchart shown in FIG. 18.

FIG. 17 is a timing chart showing an exposure control in a fourth embodiment, and FIGS. 18 and 19 show a flowchart of a program by which the exposure control is executed. With reference to these drawings, the exposure control of the fourth embodiment is described. Note that, since the circuit has the same construction as that of the first embodiment, the explanation of the circuit is omitted.

Similar to the first through third embodiments, first, the aperture 13 is fully opened, and the camera is aimed at the main object S1 in such a manner that the main object S1 is positioned at the center of the frame FR.

Steps 401 through 405 are the same as Steps 101 through 105 shown in FIG. 5. In Step 406, an exposure calculation is performed based on the second photometry value L2 (reference A3), and an aperture value AP1 and an electric charge accumulating time T1 are obtained in accordance with a predetermined program diagram. In Step 407, the aperture 13 is driven to have an opening degree corresponding to the aperture value AP1 (reference A4).

Steps 408, 409 and 411 are the same as Steps 108, 109 and 111, and in Step 409, a provisional exposure is carried out in accordance with the electric charge accumulating time T1.

In Step 412, an exposure calculation is carried out to obtain an electric charge accumulating time TT of the normal exposure (reference A8). Namely, a provisional exposure value E2 is obtained using pixel signals of a predetermined area (corresponding to the center of the frame, for example) in the image memory 26, and a ratio of the proper exposure value E0 and the provisional exposure value E2, i.e., a correction ratio of the electric charge accumulating time (i.e., exposure ratio) E0/E2 is obtained. Then, based on the first photometry value L1 obtained in Step 402, an aperture value AP2 and an electric charge accumulating time T2 are obtained in accordance with a predetermined program diagram. The electric charge accumulating time TT of the normal exposure is:

$$TT=T2\times(E0/E2) \qquad (7)$$

Namely, in the fourth embodiment, the normal electric charge accumulating time TT is not determined using the ratio L2/L1 of the photometry as in the first through third embodiments, but the exposure value of the normal exposure is controlled by adjusting the opening degree (aperture value AP2) of the aperture 13.

In Step 413, the aperture 13 is controlled so as to have an opening degree corresponding to the aperture value AP2 (reference A31), and in Step 414, the normal exposure is carried out in accordance with the aperture value AP2 and the electric charge accumulating time TT (reference A9). Steps 415 through 418 are the same as those of Steps 114 through 117 shown in FIG. 6.

As described above, according to the fourth embodiment, similar to the first through third embodiments, a proper exposure control is possible even if the main object S1 is offset from the center of the frame FR. Further, according to the fourth embodiment, when an error of the opening degree of the aperture 13 is small enough to be disregarded, the exposure value can be controlled by driving the aperture 13 again after the provisional exposure to adjust the opening degree of the aperture 13, and thus the calculating process for determining the normal electric charge accumulating time is simple.

Note that, although the proper exposure value E1 for the main object S1 is obtained by controlling the normal electric charge accumulating time TT in the first through third embodiments, the proper exposure value E1 can be obtained only by controlling the aperture value.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 6-160553 (filed on Jun. 20, 1994) which is expressly incorporated herein, by reference, in its entirety.

I claim:

1. An exposure control device provided in a still-video camera, said exposure control device comprising:

an imaging device for forming an object image;

photometry measuring means for performing photometry measurements to obtain a first photometry value corresponding to a first object and a second photometry value corresponding to a second object;

provisional exposing means for performing a provisional exposure in which said imaging device is provisionally exposed, said provisional exposure being performed in accordance with a first aperture value and a first electric charge accumulating time which are obtained based on said second photometry value, so that a provisional exposure value is obtained in accordance with an output signal of said imaging device;

means for obtaining a proper exposure value in accordance with characteristics of components of said still-video camera;

means for calculating a ratio of said proper exposure value and said provisional exposure value; and normal exposing means for performing a normal exposure in which said imaging device is normally exposed, said normal exposure being performed in accordance with a second aperture value and a normal electric charge accumulating time, said normal electric charge accumulating time being obtained based on said ratio of said proper exposure value and said provisional exposure value and said first photometry value.

2. An exposure control device according to claim 1, wherein said first aperture value is the same as said second aperture value, and said normal electric charge accumulating time is obtained according to a relationship TT=T×(E0/E2)×(L2/L1), wherein T represents said first electric charge accumulating time, E0 represents said proper exposure value, E2 represents said provisional exposure value, L2 represents said second photometry value, L1 represents said first photometry value, and TT represents said normal electric charge accumulating time.

3. An exposure control device according to claim 1, wherein said second aperture value and a second electric charge accumulating time are obtained based on said first photometry value, and said normal electric charge accumulating time is obtained according to a relationship TT=T2×(E0/E2), wherein T2 represents said second electric charge accumulating time, E0 represents said proper exposure value, E2 represents said provisional exposure value, and TT represents said normal electric charge accumulating time.

4. An exposure control device according to claim 1, wherein said photometry measuring means obtains said first and second photometry values based on output signals of a photoreceptor element provided separately from said imaging device.

5. An exposure control device according to claim 1, wherein said photometry measuring means obtains said first and second photometry values based on output signals of said imaging device.

6. An exposure control device according to claim 1, wherein said photometry measuring means obtains said first and second photometry values when an aperture is fully opened.

7. An exposure control device according to claim 1, wherein said photometry measuring means obtains said first photometry value when a release button is partly depressed, and obtains said second photometry value when said release button is fully depressed.

8. An exposure control device according to claim 1, further comprising an amplifier for amplifying an output signal of said imaging device by an amplifying factor, said normal exposing means performing said normal exposure in accordance with a normal exposing electric charge accumulating time obtained according to a relationship $TT=T\times(E0/E2)\times(L2/L1)\times(1/G)$ and said second aperture value, when a ratio of said first photometry value and said second photometry value is smaller than a predetermined value, wherein T represents said first electric charge accumulating time, E0 represents said proper exposure value, E2 represents said provisional exposure value, L2 represents said second photometry value, L1 represents said first photometry value, G represents said amplifying factor, and TT represents said normal electric charge accumulating time.

9. An exposure control device according to claim 1, further comprising a filter for restricting an amount of light entering said imaging device, said filter having a transmittance, said normal exposing means performing said normal exposure in accordance with a normal exposing electric charge accumulating time obtained according to a relationship $TT=T\times(E0/E2)\times(L2/L1)\times B$ and said second aperture value, when said a of said first photometry value and said second photometry value is larger than a predetermined value, wherein T represents said first electric charge accumulating time, E0 represents said proper exposure value, E2 represents said provisional exposure value, L2 represents said second photometry value, L1 represents said first photometry value, and 1/B represents said transmittance of said filter, and TT represents said normal electric charge accumulating time.

10. An exposure control device according to claim 1, wherein said characteristics include at least a sensitivity of said imaging device.

11. An exposure control device provided in a still-video camera, said exposure control device comprising:
   an imaging device for forming an object image;
   photometry measuring means for performing photometry measurements to obtain a first photometry value corresponding to a first object and a second photometry value corresponding to a second object;
   provisional exposing means for performing a provisional exposure in which said imaging device is provisionally exposed, said provisional exposure being performed in accordance with an aperture value and an electric charge accumulating time which are obtained based on said second photometry value, so that a provisional exposure value is obtained in accordance with an output signal of said imaging device;
   means for obtaining a proper exposure value in accordance with characteristics of components of said still-video camera, said characteristics including at least a sensitivity of said imaging device;
   means for calculating a ratio of said proper exposure value and said provisional exposure value; and
   normal exposing means for performing a normal exposure in which said imaging device is normally exposed, said normal exposure being performed in accordance with said aperture value and a normal electric charge accumulating time which is obtained according to a relationship $TT=T\times(E0/E2)\times(L2/L1)$, wherein T represents said electric charge accumulating time, E0 represents said proper exposure value, E2 represents said provisional exposure value, L2 represents said second photometry value, L1 represents said first photometry value, and TT represents said normal electric charge accumulating time.

12. An exposure control device provided in a still-video camera, said exposure control device comprising:
   an imaging device for forming an object image;
   photometry measuring means for performing photometry measurements to obtain a first photometry value corresponding to a first object and a second photometry value corresponding to a second object;
   provisional exposing means for performing a provisional exposure in which said imaging device is provisionally exposed, said provisional exposure being performed in accordance with a first aperture value and a first electric charge accumulating time which are obtained based on said second photometry value so that a provisional exposure value is obtained in accordance with an output signal of said imaging device;
   means for obtaining a proper exposure value in accordance with characteristics of components of said still-video camera, said characteristics including at least a sensitivity of said imaging device;
   means for calculating a ratio of said proper exposure value and said provisional exposure value;
   means for obtaining a second aperture value and a second electric charge accumulating time based on said first photometry value; and
   normal exposing means for performing a normal exposure in which said imaging device is normally exposed, said normal exposure being performed in accordance with said second aperture value and a normal electric charge accumulating time which is obtained according to a relationship $TT=T2\times(E0/E2)$, wherein T2 represents said second electric charge accumulating time, E0 represents said proper exposure value, E2 represents said provisional exposure value, and TT represents said normal electric charge accumulating time.

13. An exposure control device provided in a still-video camera, said exposure control device comprising:
   an imaging device for forming an object image in a frame;
   photometry measuring means for performing photometry measurements to obtain a first photometry value and a second photometry value, said first photometry value being obtained when a main object is positioned at the center of the frame, said second photometry value being obtained when said main object is positioned offset from the center of the frame;
   provisional exposing means for performing a provisional exposure in which said imaging device is provisionally exposed, said provisional exposure being performed in accordance with an aperture value and an electric charge accumulating time which are obtained based on said second photometry value, so that a provisional exposure value is obtained in accordance with an output signal of said imaging device;
   means for obtaining a proper exposure value in accordance with characteristics of said still-video camera, said characteristics including at least a sensitivity of said imaging device;
   means for calculating a ratio of said proper exposure value and said provisional exposure value; and
   normal exposing means for performing a normal exposure in which said imaging device is normally exposed, said normal exposure being performed in accordance with said aperture value and a normal electric charge accumulating time which is obtained according to a relationship $TT=T\times(E0/E2)\times(L2/L1)$, wherein T represents said electric charge accumulating time, E0 represents said proper exposure value, E2 represents said provisional exposure value, L2 represents said second photometry value, L1 represents said first photometry value, and TT represents said normal electric charge accumulating time.

14. An exposure control device provided in a still-video camera, said exposure control device comprising:

an imaging device for forming an object image in a frame;

photometry measuring means for performing photometry measurements to obtain a first photometry value and a second photometry value, said first photometry value being obtained when a main object is positioned at the center of the frame, said second photometry value being obtained when said main object is positioned offset from the center of the frame;

provisional exposing means for performing a provisional exposure in which said imaging device is provisionally exposed, said provisional exposure being performed in accordance with a first aperture value and a first electric charge accumulating time which are obtained based on said second photometry value so that a provisional exposure value is obtained in accordance with an output signal of said imaging device;

means for obtaining a proper exposure value in accordance with characteristics of said still-video camera, said characteristics including at least a sensitivity of said imaging device;

means for calculating a ratio of said proper exposure value and said provisional exposure value;

means for obtaining a second aperture value and a second electric charge accumulating time based on said first photometry value; and normal exposing means for performing a normal exposure in which said imaging device is normally exposed, said normal exposure being performed in accordance with said second aperture value and a normal electric charge accumulating time which is obtained according to a relationship TT=T2×(E0/E2), wherein T2 represents said second electric charge accumulating time, E0 represents said proper exposure value, E2 represents said provisional exposure value, and TT represents said normal electric charge accumulating time.

15. An exposure control device provided in a still-video camera, said exposure control device comprising:

a switch for carrying out a photographing operation;

photometry measuring means for performing photometry measurements to obtain a first photometry value and a second photometry value, said first photometry value being obtained before said switch is turned ON, said second photometry value being obtained when said switch is turned ON;

means for obtaining an aperture value and an electric charge accumulating time based on a ratio of said second photometry value and said first photometry value;

an imaging device for forming an object image; and exposing means for performing an exposure in which said imaging device is exposed to form said object image so that an image signal corresponding to said object image is generated, said exposure being performed in accordance with said aperture value and said electric charge accumulating time.

16. An exposure control device provided in a still-video camera, said exposure control device comprising:

an imaging device for forming an object image;

a photometry measuring device that performs photometry measurements to obtain a first photometry value corresponding to a first object and a second photometry value corresponding to a second object;

a provisional exposing system that performs a provisional exposure in which said imaging device is provisionally exposed, said provisional exposure being performed in accordance with a first aperture value and a first electric charge accumulating time which are obtained based on said second photometry value, so that a provisional exposure value is obtained in accordance with an output signal of said imaging device;

a device which obtains a proper exposure value in accordance with characteristics of said still-video camera;

a device which calculates a ratio of said proper exposure value and said provisional exposure value; and a normal exposure device that performs a normal exposure in which said imaging device is normally exposed, said normal exposure being performed in accordance with a second aperture value and a normal electric charge accumulating time, said normal electric charge accumulating time being obtained based on said ratio of said proper exposure value and said provisional exposure value and said first photometry value.

17. An exposure control device provided in a still-video camera, said exposure control device comprising:

an imaging device that forms an object image;

a photometry measuring device that performs photometry measurements to obtain a first photometry value corresponding to a first object and a second photometry value corresponding to a second object;

a provisional exposing system that performs a provisional exposure in which said imaging device is provisionally exposed, said provisional exposure being performed in accordance with an aperture value and an electric charge accumulating time which are obtained based on said second photometry value, so that a provisional exposure value is obtained in accordance with an output signal of said imaging device;

a device which obtains a proper exposure value in accordance with characteristics of said still-video camera, said characteristics including at least a sensitivity of said imaging device;

a device which calculates a ratio of said proper exposure value and said provisional exposure value; and a normal exposing system that performs a normal exposure in which said imaging device is normally exposed, said normal exposure being performed in accordance with said aperture value and a normal electric charge accumulating time which is obtained according to:

$$TT=T\times(E0/E2)\times(L2/L1),$$

wherein T represents said electric charge accumulating time, E0 represents said proper exposure value, E2 represents said provisional exposure value, L2 represents said second photometry value, L1 represents said first photometry value, and TT represents said normal electric charge accumulating time.

18. An exposure control device provided in a still-video camera, said exposure control device comprising:

an imaging device that forms an object image;

a photometry measuring device that performs photometry measurements to obtain a first photometry value corresponding to a first object and a second photometry value corresponding to a second object;

a provisional exposing system that performs a provisional exposure in which said imaging device is provisionally exposed, said provisional exposure being performed in accordance with a first aperture value and a first electric charge accumulating time which are obtained based on said second photometry value so that a provisional exposure value is obtained in accordance with an output signal of said imaging device;

a device which obtains a proper exposure value in accordance with characteristics of said still-video camera, said characteristics including at least a sensitivity of said imaging device;

a device which calculates a ratio of said proper exposure value and said provisional exposure value;

a device which obtains a second aperture value and a second electric charge accumulating time based on said first photometry value; and a normal exposing system that performs a normal exposure in which said imaging device is normally exposed, said normal exposure being performed in accordance with said second aperture value and a normal electric charge accumulating time which is obtained according to:

$$TT=T2\times(E0/E2),$$

wherein T2 represents said second electric charge accumulating time, E0 represents said proper exposure value, E2 represents said provisional exposure value, and TT represents said normal electric charge accumulating time.

19. An exposure control device provided in a still-video camera, said exposure control device comprising:

an imaging device that forms an object image in a frame;

a photometry measuring device that performs photometry measurements to obtain a first photometry value and a second photometry value, said first photometry value being obtained when a main object is positioned at the center of the frame, said second photometry value being obtained when said main object is positioned offset from the center of the frame;

a provisional exposing system that performs a provisional exposure in which said imaging device is provisionally exposed, said provisional exposure being performed in accordance with an aperture value and an electric charge accumulating time which are obtained based on said second photometry value, so that a provisional exposure value is obtained in accordance with an output signal of said imaging device;

a device which obtains a proper exposure value in accordance with characteristics of said still-video camera, said characteristics including at least a sensitivity of said imaging device;

a device which calculates a ratio of said proper exposure value and said provisional exposure value; and a normal exposing system that performs a normal exposure in which said imaging device is normally exposed, said normal exposure being performed in accordance with said aperture value and a normal electric charge accumulating time which is obtained according to:

$$TT=T\times(E0/E2)\times(L2/L1),$$

wherein T represents said electric charge accumulating time, E0 represents said proper exposure value, E2 represents said provisional exposure value, L2 represents said second photometry value, L1 represents said first photometry value, and TT represents said normal electric charge accumulating time.

20. An exposure control device provided in a still-video camera, said exposure control device comprising:

an imaging device that forms an object image in a frame;

a photometry measuring device that performs photometry measurements to obtain a first photometry value and a second photometry value, said first photometry value being obtained when a main object is positioned at the center of the frame, said second photometry value being obtained when said main object is positioned offset from the center of the frame;

a provisional exposing system that performs a provisional exposure in which said imaging device is provisionally exposed, said provisional exposure being performed in accordance with a first aperture value and a first electric charge accumulating time which are obtained based on said second photometry value so that a provisional exposure value is obtained in accordance with an output signal of said imaging device;

a device which obtains a proper exposure value in accordance with characteristics of said still-video camera, said characteristics including at least a sensitivity of said imaging device;

a device which calculates a ratio of said proper exposure value and said provisional exposure value;

a device which obtains a second aperture value and a second electric charge accumulating time based on said first photometry value; and a normal exposing system that performs a normal exposure in which said imaging device is normally exposed, said normal exposure being performed in accordance with said second aperture value and a normal electric charge accumulating time which is obtained according to:

$$TT=T2\times(E0/E2),$$

wherein T2 represents said second electric charge accumulating time, E0 represents said proper exposure value, E2 represents said provisional exposure value, and TT represents said normal electric charge accumulating time.

21. An exposure control device provided in a still-video camera, said exposure control device comprising:

a switch that carries out a photographing operation;

a photometry measuring device that performs photometry measurements to obtain a first photometry value and a second photometry value, said first photometry value being obtained before said switch is turned ON, said second photometry value being obtained when said switch is turned ON;

a device which obtains an aperture value and an electric charge accumulating time based on a ratio of said second photometry value and said first photometry value;

an imaging device that forms an object image; and an exposing system that performs an exposure in which said imaging device is exposed to form said object image so that an image signal corresponding to said object image is generated, said exposure being performed in accordance with an aperture value and an electric charge accumulating time.

* * * * *

UNITED STATES PATENT AND TRADEMARK OFFICE
CERTIFICATE OF CORRECTION

PATENT NO. : 5,751,352
DATED : May 12, 1998
INVENTOR(S) : Kimiaki Ogawa

It is certified that error appears in the above-identified patent and that said Letters Patent is hereby corrected as shown below:

Title page, item [75], Inventors, change "Itabashi-ku" to --Tokyo--.

Signed and Sealed this

Twenty-second Day of September, 1998

Attest:

BRUCE LEHMAN

Attesting Officer

Commissioner of Patents and Trademarks